United States Patent
Fairweather

(10) Patent No.: US 7,143,087 B2
(45) Date of Patent: Nov. 28, 2006

(54) SYSTEM AND METHOD FOR CREATING A DISTRIBUTED NETWORK ARCHITECTURE

(76) Inventor: John Fairweather, 1649 Wellesley Dr., Santa Monica, CA (US) 90405

( * ) Notice: Subject to any disclaimer, the term of this patent is extended or adjusted under 35 U.S.C. 154(b) by 661 days.

(21) Appl. No.: 10/357,259

(22) Filed: Feb. 3, 2003

(65) Prior Publication Data

US 2003/0191752 A1 Oct. 9, 2003

(51) Int. Cl.
*G06F 7/00* (2006.01)
*G06F 17/30* (2006.01)

(52) U.S. Cl. .............................................. 707/3; 707/1
(58) Field of Classification Search ................ 707/3, 707/1
See application file for complete search history.

(56) References Cited

U.S. PATENT DOCUMENTS

| | | | | |
|---|---|---|---|---|
| 4,918,526 | A * | 4/1990 | Lewis et al. ................. | 348/580 |
| 6,003,066 | A * | 12/1999 | Ryan et al. .................. | 709/201 |
| 6,098,093 | A * | 8/2000 | Bayeh et al. ................ | 709/203 |
| 6,226,630 | B1 * | 5/2001 | Billmers ...................... | 707/3 |
| 6,470,389 | B1 * | 10/2002 | Chung et al. ............... | 709/227 |
| 6,671,273 | B1 * | 12/2003 | Beck .......................... | 370/389 |
| 2003/0046690 | A1 * | 3/2003 | Miller ......................... | 725/36 |
| 2003/0210329 | A1 * | 11/2003 | Aagaard et al. ............ | 348/159 |
| 2003/0212834 | A1 * | 11/2003 | Potter et al. ................ | 709/318 |
| 2004/0024897 | A1 * | 2/2004 | Ladd et al. ................. | 709/231 |

* cited by examiner

*Primary Examiner*—Thomas Lee
*Assistant Examiner*—Ji H. Bae
(74) *Attorney, Agent, or Firm*—Merchant & Gould PC; Stanley J. Gradisar

(57) ABSTRACT

A large scale distributed multimedia system comprising the following: i) one or more server(s), wherein each server includes a main server thread, one or more threads capable of monitoring incoming data feeds and instantiating the resultant data into the system (monitoring threads), one or more threads capable of handling incoming data requests (request threads), and cache memory; ii) a mass storage system (MSS), wherein the MSS stores information concerning the arrangement of one or more server(s) and is capable of controlling one or more robotic autoloader systems (robots); iii) a types system for defining data types at a binary level and for associating those data types with one or more server(s) such that the mapping maps data types with the servers that must be addressed to obtain the corresponding data; and iv) a query system for executing data queries on servers mapped to the data type being queried. Additional features are also supported including registration on one or more servers of customized commands and functions, and input and output folders for transmitting data to or from data storage.

34 Claims, 6 Drawing Sheets

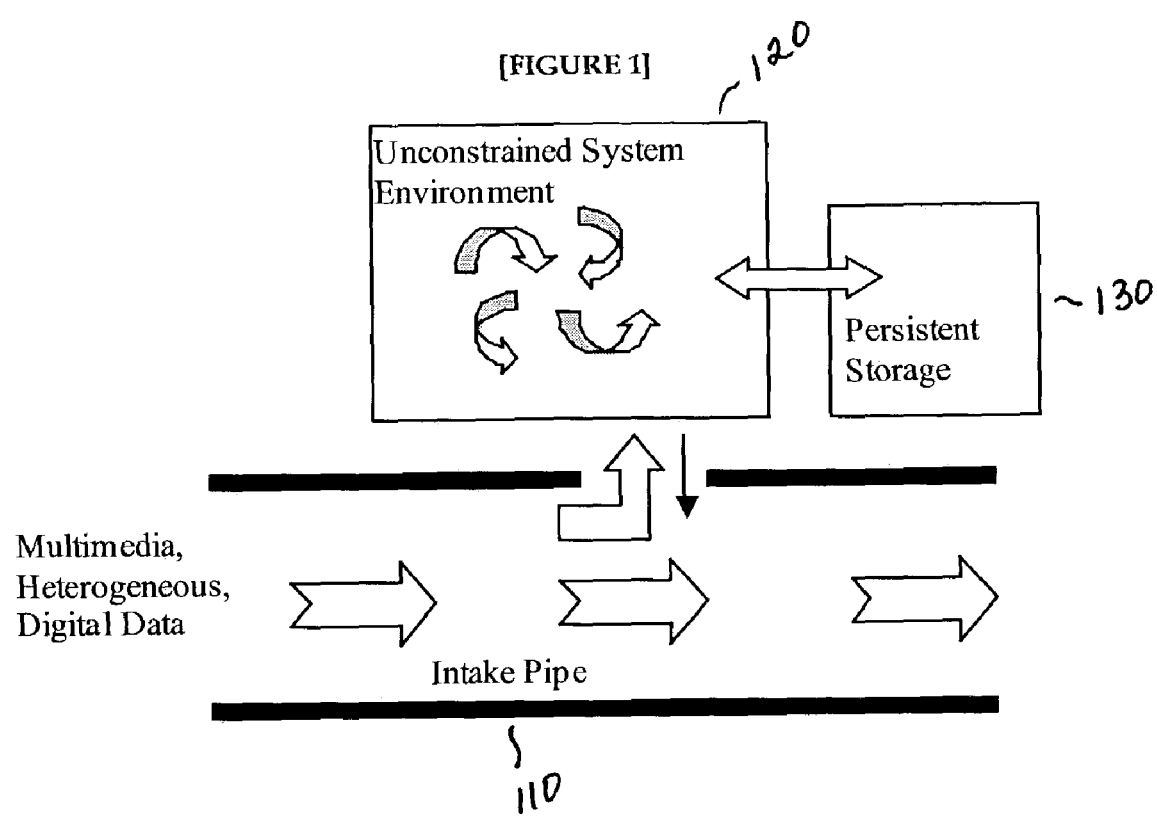
[FIGURE 1]

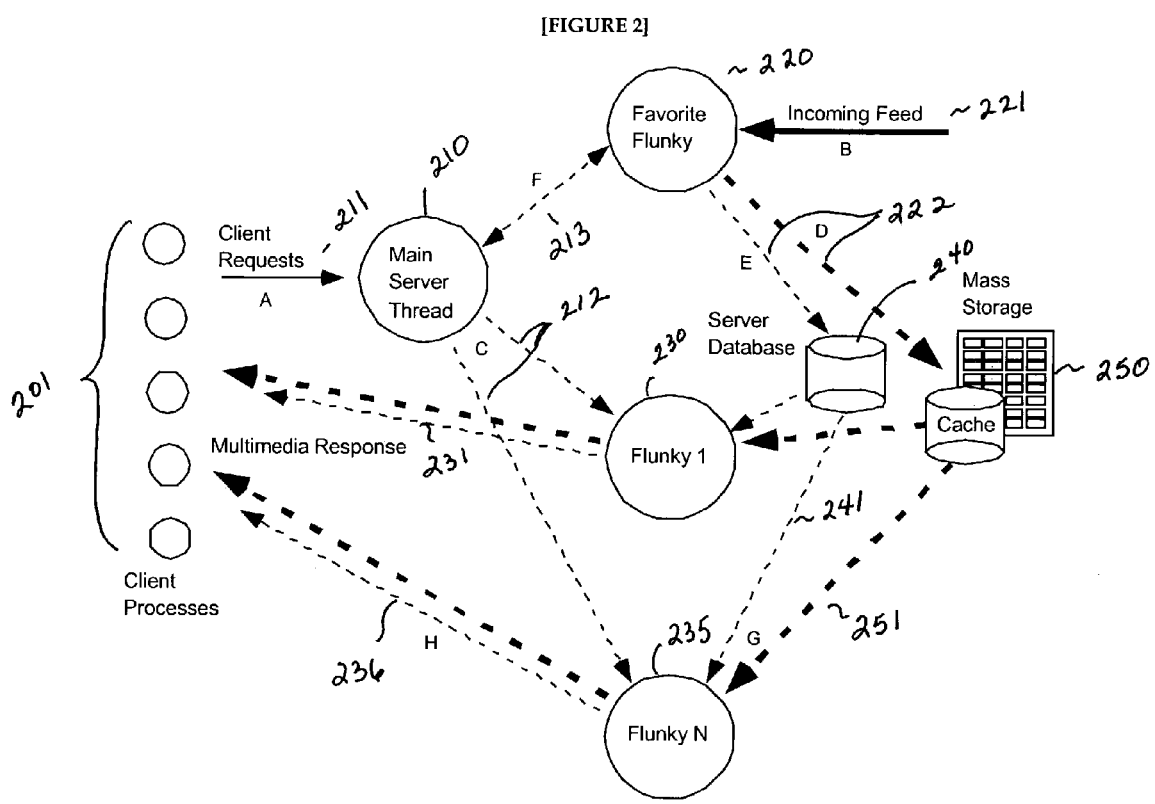
[FIGURE 2]

[FIGURE 3]
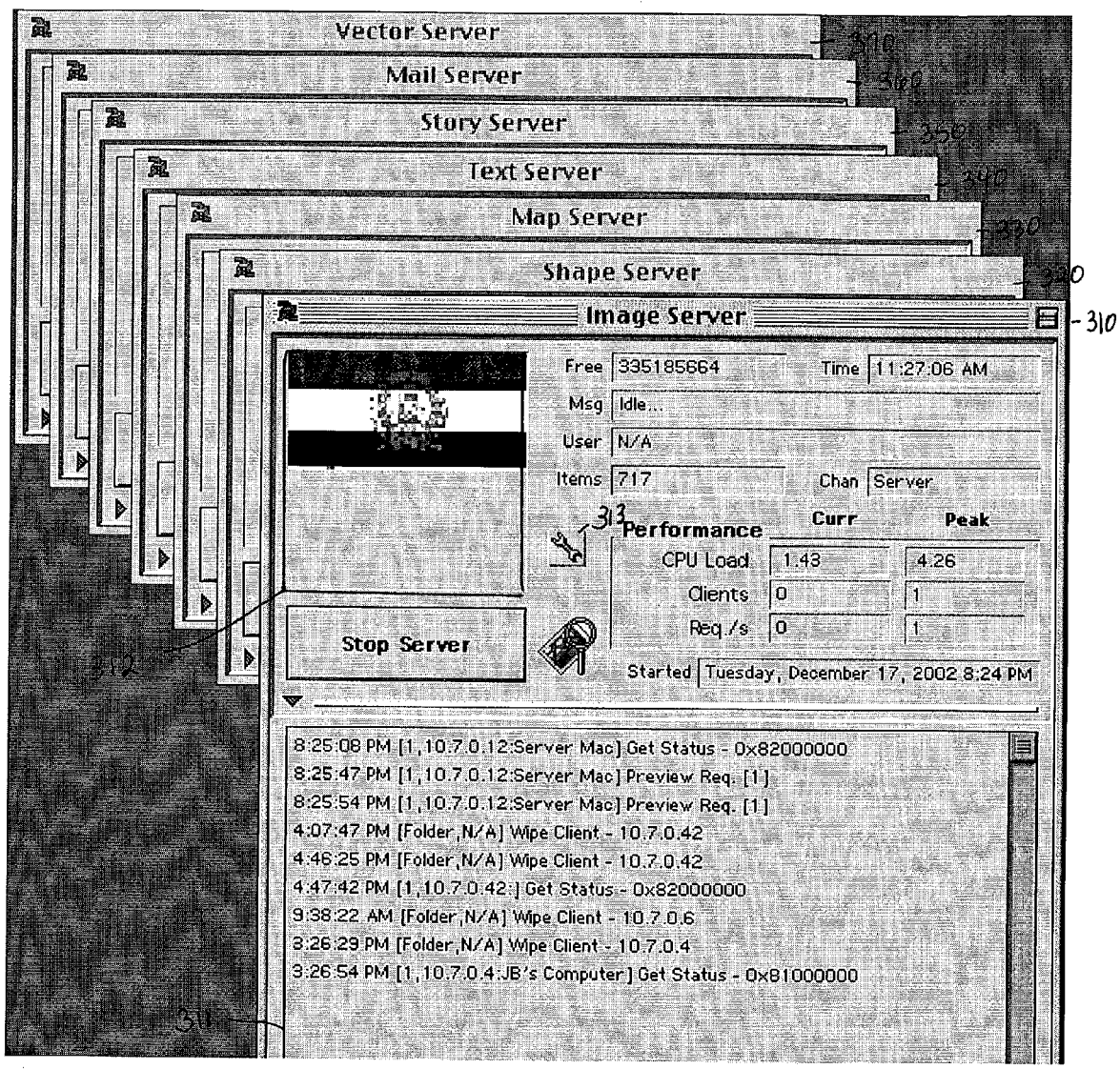

[FIGURE 4]
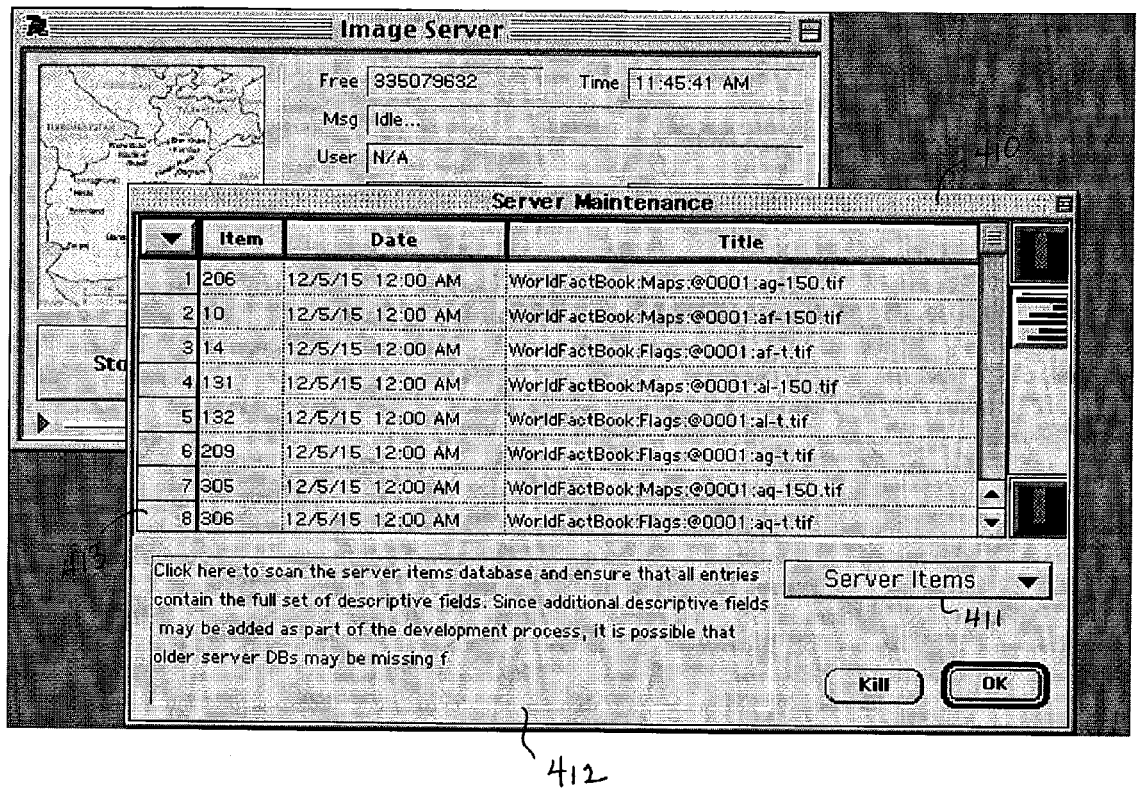

[FIGURE 5]
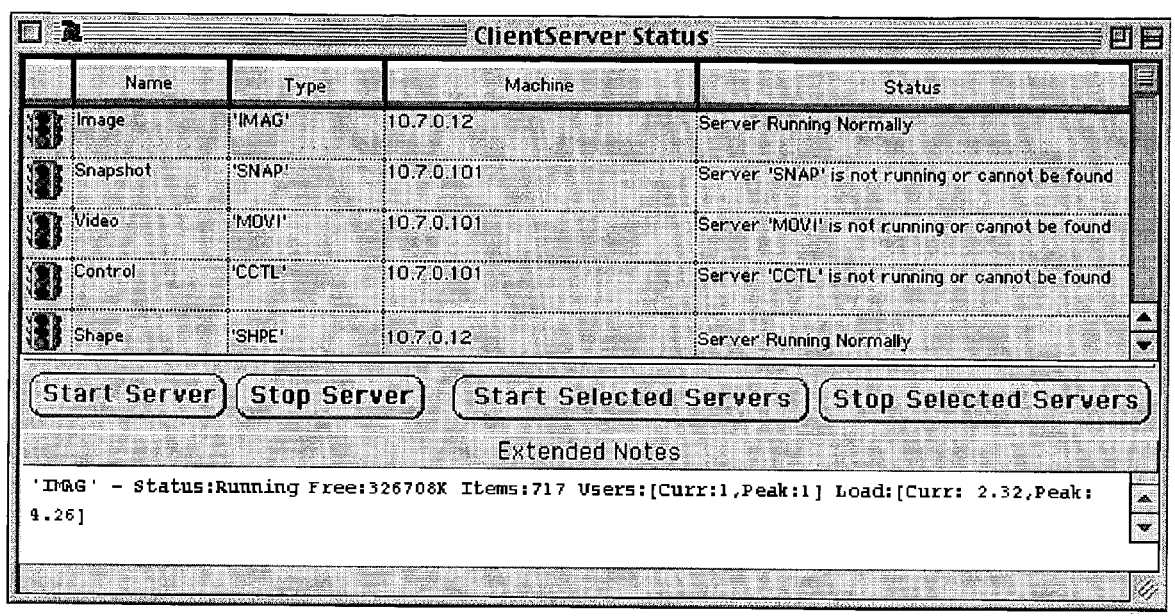
500

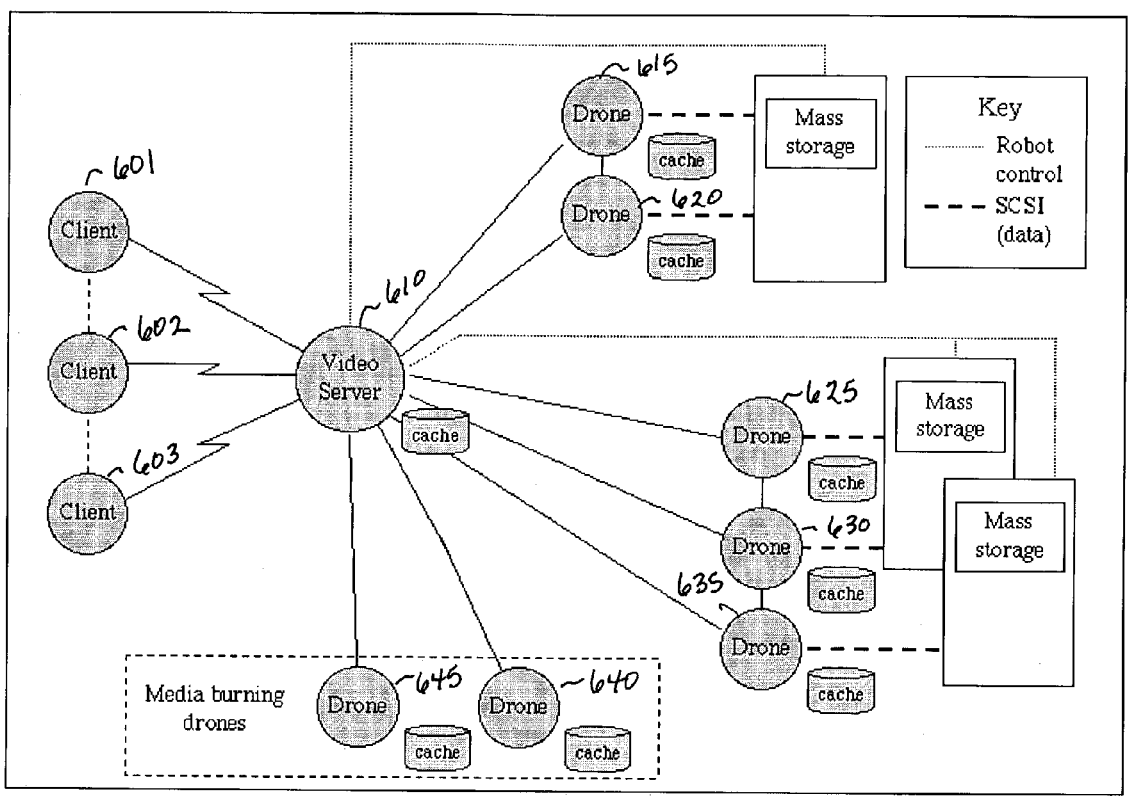
[FIGURE 6]

SYSTEM AND METHOD FOR CREATING A DISTRIBUTED NETWORK ARCHITECTURE

BACKGROUND OF THE INVENTION

Current solutions to solving the distributed information problem fall into two main classes: the client/server approach and the peer-to-peer approach. In a client/server system, there is generally a large powerful central server, usually a relational database, to which a set of clients talks in order to fetch, update, and query information. Such a network architecture can be viewed as a star with the clients forming the edges of the star and the large central server the center. The current state of the art in this field adds limited ability to distribute the central database to multiple server machines with perhaps the most sophisticated form being the "Information Warehouse" or "Corporate Information Factory" (CIF) approach described in the book "Corporate Information Factory" by W. H Inmon, Claudia Imhoff, and Ryan Sousa. Unfortunately, the CIF approach falls far short of what is necessary to handle more sophisticated systems such as those required for intelligence purposes, for example.

The peer-to-peer approach overcomes many of the limitations of the centralized system by allowing many machines on a network to cooperate as peers, however it does this by removing the concept of the specialized server, which limits its applicability in the area of intelligence systems, where the need for powerful distributed clusters of machines operating as a single logical 'server' for the purposes of processing an incoming 'feed' remains. Furthermore, neither approach addresses the needs of multimedia data and the consequent storage and 'streaming' demands that it places on the server architecture. Once the purpose of a system is broadened to acquisition of unstructured, non-tagged, time-variant, multimedia information (much of which is designed specifically to prevent easy capture and normalization by non-recipient systems), a totally different approach is required. In this arena, many entrenched notions of information science and database methodology must be discarded to permit the problem to be addressed. We shall call systems that attempt to address this level of problem, 'Unconstrained Systems' (UCS). An unconstrained system is one in which the source(s) of data have no explicit or implicit knowledge of, or interest in, facilitating the capture and subsequent processing of that data by the system.

What is needed, then, is an architecture that embodies concepts from both the client/server and the peer-to-peer approach, but which is modified to reflect the unique needs of a distributed multimedia intelligence system.

SUMMARY OF INVENTION

The present invention provides a network architecture that embodies the best of both of these approaches while still providing robust support for multimedia distribution. The invention is comprised of the following components:

a) A customizable (preferably via registered plug-ins) multi-threaded and distributed server implementation containing a main server thread 210, one or more built-in threads for monitoring incoming 'feeds' and instantiating the resultant data into the system, and one or more threads for handling incoming client requests. This server implementation can be extended in a hierarchical manner so that each server has a 'drone' server (to any number of levels) which transparently operate as part of the logical server cluster and which are tasked by the main server machine. All communication between clients, servers, and drones occurs via a standard protocol, such as TCP/IP, so that the logical server cluster, including associated mass storage, can be physically distributed over a wide area.

b) A tightly integrated mass storage (MSS) framework that is cognizant of the arrangement of server machines in the cluster and the storage devices to which they are attached, and which is capable of controlling one or more possibly heterogeneous connected robotic autoloader systems in order to ensure that whenever any machine of the cluster requires information stored on a robot, the media that contains the information is automatically mounted into a drive that is connected to that machine. In the preferred embodiment, automatic creation of archive media and its migration from cache to robotic storage is tightly integrated with the server architecture, and the mass storage system may be extended to support new mass storage devices by defining device drivers that map the logical operations performed by the MSS onto the physical commands necessary to implement them for a given device.

c) A standardized framework for defining data types at a binary level and for associating those data types with one or more server clusters on the network such that the mapping between data types and the servers that must be addressed to obtain the corresponding data can be made automatically from anywhere in the environment.

d) A standardized framework for defining and executing queries on servers, for distributing portions of those queries to the servers involved, and for reassembling the results of such distributed queries into a unified "hit list" for the client, including the ability to save and execute these queries on a continuous basis against any new information acquired from the feed.

A number of extensions and enhancements are also disclosed but given this architecture, any number of additional improvements and permutations would be obvious to those skilled in the art. For example, the system could include an 'output' folder into which the multimedia portion of any data acquired by the server is placed and which serves as the framework within which the server builds up batches of information to be migrated to the mass storage subsystem as appropriate.

BRIEF DESCRIPTION OF THE DRAWINGS

FIG. 1 illustrates a basic configuration of an intelligence system.

FIG. 2 illustrates a sample structure of a server in the mass storage system architecture (MSS) of the present invention.

FIG. 3 shows a sample screen shot illustrating a typical set of server windows.

FIG. 4 illustrates a sample image showing the results of clicking on the button.

FIG. 5 illustrates a sample client/server status window.

FIG. 6 illustrates a sample embodiment of a master server (in this case, a video server) and a cluster of drone machines.

DETAILED DESCRIPTION OF THE PREFERRED EMBODIMENT(S)

The descriptions given below may refer to a number of other key technologies and concepts, with which the reader is assumed to be familiar, and will be helpful to fully appreciate the material presented herein. These various building-block technologies have been previously described in the following patent applications (which have been expressly incorporated herein):

1) Appendix 1—Types Patent
2) Appendix 2—Collections Patent
3) Appendix 3—Ontology Patent
4) Appendix 4—MitoMine Patent Referring now to FIG. 1, a basic configuration of an intelligence system is illustrated. Digital data of diverse types flows through the (distributed) intake pipe 110 and some small quantity is extracted, normalized, and transferred into the system environment 120 and persistent storage 130. Once in the environment 120, the data is available for analysis and intelligence purposes. Any intercepted data that is not sampled as it passes the environment intake port, is lost.

Because of the vast amounts of data that will be acquired and stored, a layered mass storage system (MSS) architecture is provided wherein data initially arrives in a (distributed) cache and is then automatically and transparently migrated onto deep storage media. In the preferred embodiment, the ability to interface to, and control, heterogeneous robotic mass storage farms is provided. In such a system, all data remains on-line or, if archived data is requested, the system must be able to cause the appropriate robot to load it. Because the migration, media, and retrieval process is dependant on not only the data type involved but also on the physical distribution of the servers, as well as other factors, the MSS architecture is intimately tied to the server framework provided by the UCS. The system also advantageously uses the fact that, in most cases, the number of accesses to a given datum tends to follow an exponential decay with its age. Thus recent data, which is accessed far more heavily, will often reside in the cache. Archival data, on the other hand, migrates over time to the robot farm. Because older data may become the subject of intense interest, however, the MSS architecture also transparently handles the temporary migration of this data back into cache.

The environment also supports the ability to customize migration strategies on a per-server basis to support other approaches, perhaps based on frequency of access, item content, or other considerations. Because on-line storage is costly, the system has been adapted to use and access low cost random-access media (such as CDs and DVDs) and is also capable of smoothly migrating to newer, denser, media as it becomes available. Manual media loading by an operator is also provided transparently by the system when necessary (such as when truly massive amounts of data or being requested). The system provides this functionality by routing media load requests to an operator station(s) and can guide to the operator through the loading (and un-loading) sequence. It is anticipated access time increases as data moves deeper and deeper into the archive, however, the primary goal of this system is to permit transparent access to data no matter where it is stored. Again, in the preferred embodiment, robots are loaded with blank media, connected and configured, and then left alone to automatically become part of the archive over time.

Given the scale of the problem, in the preferred embodiment, even individual servers are implemented as distributed clusters. The environment also provides extensive support for the re-configuration of any system parameter that might change.

Before going further, it is important to understand what is meant by a "server" and a "client" in such a system. In conventional client/server architectures, a server is essentially a huge repository for storing, searching, and retrieving data. Clients tend to be applications or veneers that access or supply server data in order to implement the required system functionality. In this architecture, servers must sample from the torrent of data going though the (virtual) intake pipe.

Thus it is clear that, unlike the standard model, the servers in this system will automatically create and source new normalized data gleaned from the intake pipe and then examine that data to see if it may be of interest to one or more users. For these reasons, every server has a built in client capable of sampling data in the pipe and instantiating it into the server and the rest of persistent storage as necessary. Thus, the present system discards use of the standard 'server' and instead uses server-client pair(s).

In the preferred embodiment, since each server will specialize in a different kind of multimedia or ontological data, and because the handling of each and every multimedia type cannot be defined beforehand, the basic behaviors of a server (e.g., talking to a client, access to storage, etc.) are provided by the architecture. In the event that it is desirable to customize server behaviors, the server calls a plug-in API that allows system programmers to define these behaviors. For example, certain specialized servers may have to interface directly to legacy or specialized external systems and will have to seamlessly (and invisibly) utilize the capabilities of those external systems while still providing behaviors and an interface to the rest of the environment. An example of such an external system might be a face, voice, or fingerprint recognition system. Furthermore, new servers may be brought on line to the system at any time and must be able to be found and used by the rest of the system as they are added. While this discussion has referenced "servers" throughout, there is no reason (and the system supports) use of a 'client' machine that can declare its intent to 'serve' data into the environment. Indeed, in a large community of analysts, this ability is essential if analysts are to be able to build on and reference the work of others. Thus every client is also potentially a server. The only remaining distinction between a mostly-server and a mostly-client is that a server tends to source a lot more data on an on-going basis than does a client. Finally, the present architecture permits application code running within the system to remain unaware of the existence of such things as a relational database or servers in general thereby permitting many "general utility" applications. As this description makes clear, this UCS architecture is more like a peer-to-peer network than it is a classic client/server model.

Referring now to FIG. 2, a diagram illustrating a sample structure of a server in the mass storage system architecture (MSS) of the present invention is shown. The construction of a single machine server within the architecture of this invention will first be described and then this approach will be generalized to the distributed case. The server itself consists of three types of processes (threads), the "main server thread" 210, the "favorite flunky" 220, and one or more "standard flunkies" 230, 235. The main server thread 210 is responsible for receiving 211 and routing 212 client requests and otherwise coordinating the activities of all processes within the server. The favorite flunky 220 is primarily responsible for monitoring the stream of data arriving from the data feed 221, interpreting its contents, and writing 222 the data into server storage 240, 250 where it may be accessed 241, 251 by other flunkies 235 in response to client requests 211. In the preferred embodiment, the standard flunky processes 230, 235 are created on an "as needed" basis, and are responsible for handling client requests (as routed 212 by the main server thread 210), and transmitting 231, 236 the results back to the client processes 201. The maximum number of standard flunkies 230, 235 within a server will thus be equal to the maximum number of simultaneous client requests 211 that the server has experienced because the main server thread 210 will only create a new flunky thread when all currently available flunky threads 230, 235 are already busy. When a client request 211 completes, the flunky thread 230, 235 responsible for handling it is entered into a list (not shown) of available threads so that it can be re-tasked by the main server thread 210 when the next client request 211 arrives. The favorite flunky 220 is also utilized by the main server thread 210 to accomplish various other housekeeping or batch tasks in order to insure that the main server thread 210 remains responsive to new client requests 211 coming in. There is therefore communication 213 and close coordination between the activity of the favorite flunky 220 and the needs of the main server thread 210. It is for this same reason that the main server thread 210 would preferably pass off all client requests 211 to the standard flunkies 230, 235 since the main server thread 210 cannot know how long the processing of the client request 211 will take.

In the preferred embodiment, the server package provides support for up to 5 distinct directories (not all of which may be required for a particular server) that may be used by servers (or registered server plug-ins) for distinct purposes as follows:

Input Folder—This is the directory where incoming multimedia data arrives from the feed (or elsewhere). The input folder may be hierarchical (i.e., contain folders within it to any level), and when any item is moved from the input folder to the output folder, the corresponding portion of the folder hierarchy will be replicated there thus allowing multimedia data to be organized based either on feed(s) or on any other system chosen by the client processes (see API below). The favorite flunky's primary task is to monitor the input folder for any sign of change or new files, and when such occurs, to process whatever is new as determined by the registered plug-ins.

Output Folder—The output folder is the place where all the multimedia data arriving at the input folder is moved once it has been ingested by the favorite flunky 220. Its structure may be hierarchical as determined by the input folder structure. It is within the output folder, which is essentially a multimedia cache 250 in the case of servers with associated robotic mass storage, where the various MSS media 'chunk' images are built up prior to being sent to be moved to (or otherwise stored in) mass storage.

Aliases Folder—The aliases folder provides the ability for a server to 'pull' information from sources or feeds on other machines, rather than the more conventional 'push' feed architecture provided by the input folder. An alias may be created and placed into the aliases folder (either manually or through the API) which will cause the favorite flunky 220 to remotely mount the corresponding disk and directory from another machine on the network and, if anything new is found therein, to copy it over to the input folder and optionally delete the original. This means, for example, that users can drop files into a directory in their local machine and they will be fetched and processed in a scheduled manner by the server using the alias mechanism. Like the input and output folders, this folder may be hierarchical, and any hierarchy will be reflected as the data is moved to subsequent folders of the server during processing.

Rejects Folder—If an error occurs during the process of data in the input folder by the favorite flunky 220, the data file(s), instead of being moved to the output folder, will be moved to the reject folder. The purpose is to allow system operators to examine such rejected material and determine why it was rejected. If the reason for the rejection can be corrected (perhaps by altering the data mining script used for ingestion), then the reject files can be dragged back into the input folder where they will then be processed correctly thus avoiding data loss.

Collections Folder—This folder contains the extracted ontological data (see Ontology Patent), which is referred to in a server context as the 'descriptors', for the items extracted from the feed. This folder contains collections often organized in a directory hierarchy that matches the system ontology. These collections are referred to in a server context as the server database 240. The server performs many functions, especially in terms of querying, by performing operations on the database 240. For this reason, it is only necessary to retrieve material from mass storage when the full multimedia content is requested by the client (e.g., movie playback). For certain server types that do not relate directly to the ontology, a simplified database based on the ET_StringList type may optionally be used.

For further clarification, Appendix A provides sample code illustrating the processing of incoming events and performance of scheduled tasks by the main server thread 210. Appendix A also provides sample code for the command receipt and response process performed by the favorite flunky 220.

Referring now to FIG. 3, a sample screen shot illustrating a typical set of server windows 310, 320, 330, 340, 350, 360, 370 is shown. This figure shows a typical set of server windows 310, 320, 330, 340, 350, 360, 370 running on a single machine (although servers would often run on different machines). In the preferred embodiment, all servers created in this framework would essentially look the same, the only difference(s) between them being the nature of the plug-ins that have been registered on the server in order to customize the server behavior for the data type concerned.

The server window 310 has been expanded to show the contents of a typical server activity log 311 and also indicates the use of the 'picon' feature, in this case the last image fetched from the Image server 310 was of the flag of Afghanistan so this flag is displayed in the picon area 312. Other servers may display different things in this area, depending on the nature of the "picon maker" plug-in registered. In this server window, a button 313 is provided such that clicking on this button 313 causes the server's maintenance window to be displayed.

Referring now to FIG. 4, a sample image showing the results of clicking on the button 313 is shown. The pop-up menu 411 of the maintenance window 410 allows the user to choose from one of a number of registered logical 'pages' containing information and allowing operations that relate to a particular class of maintenance actions on the server 310. The maintenance window API (see below) allows the registration of a set of maintenance 'buttons' with any defined page. In the illustrated case, the page mapped to the pop-up menu 411 is "Server Items." In the preferred embodiment, a text area 412 is provided which provides description/help information for the button whenever an input device, such as a mouse, is over the button concerned. In the illustrated embodiment, the server maintenance window 410 also includes a "server items" area 413. In this case, the server items area 413 provides unique item ID along with the time the item was captured by the system and the path in the output folder where the file containing the multimedia content of the item has been placed. For example, the list in this case indicates that the images are from an output folder titled "WorldFactBook" and that they are part of archive batch "@0001" (see below for details). If the items had already been archived to robotic storage, the path could be modified to reflect this fact. Three maintenance pages are pre-defined by the server implementation itself:

Server Items—This page preferably allows examination of, and operations on, any item in the server.

Archive items—This page preferably permits examination of the state of any archive 'batch' and operations thereon. The process of building up a batch, sending it to be burned, moving it to robotic storage, and then purging the original from the output folder, may be quite complex in some instances, and a number of maintenance actions may be required should anything go wrong in this sequence.

Archive Devices—This page preferably allows direct control over the robotic storage devices attached to the server. For example one could move media within and between robots, initiate re-calibration of the robot contents, etc. Again the number of possibilities here is quite large and varies from one robot type to another. For this reason, the present invention provides an open-ended registry for robotic maintenance actions. The need for tight integration of robotic storage activity and the state information held in the server is clear.

The dispatching of incoming requests from clients to the standard flunkies that will handle them occurs in the communications handler associated with the main server thread 210, that is it is asynchronous to thread operation and occurs essentially at interrupt level. There are a huge number of possible client commands that must be routed in this manner (see API below). The processing performed in this context for any given command is essentially as follows:

```
           case kCommandType:
               ip = server status record
               fp = SV_FindFreeFlunky(ip);   // find/make flunky to
   handle cmd
               copy client parameters to flunky buffer area
               if ( command was proxy routed )
                   strip of proxy routing tag in flunky buffer area
               issue command to flunky
               break;
Where:
int32 SV_FindFreeFlunky         (              // find/create a free
flunky
                           ET_CSStatePtr ip   // IO:Pointer to IP
Server Status
                                )              // R:Index for the
flunky selected
   {
       for ( i = 0 ; i < max simultaneous users ; i++ )
       {                                      // scan all our flunky
records
           fp = &flunky[i]
           if ( flunky is free )
           {
               return i;
           } else if ( !fp->flags )           // uninitialized record,
use it
           {
               fp = create a new flunky and flunky buffer area
               return i;
           }
       }
       log "too many simultaneous users!" error
       return error
   }
```

A sample list of the major commands that are preferably supported by the architecture are as follows:

```
#define  kCStrigger            'csTR'   // Trigger an IP (server->client)
#define  kCSabort              'csAB'   // aborted server command (server-
>client)
#define  kCSoneItem            'csI1'   // data for single item requested
(server->client)
#define  kCSitemChunk          'csIn'   // data for chunk of items (server-
>client)
#define  kCSitemResponse       'csRs'   // respose data for a command
(server->client)
#define  kCSforwardCmd         'csFW'   // Forward a client command (server-
>server)
#define  kCSAcknowledge        'csAK'   // Acknowledge
#define  kCSCollectionCmd      'csCO'   // collection command (client-
>server)
#define  kCSunload             'csUL'   // unload an IP (client->server)
#define  kCSstart              'csGO'   // start a server (client->server)
#define  kCSstop               'csOF'   // stop a server (client->server)
#define  kCSload               'csLD'   // load an IP (client->server)
#define  kCSfetch              'csFT'   // fetch an IP (client->server)
#define  kCSkill               'csKL'   // kill all IPs for this machine
(client->server)
#define  kCSuserCmd            'csUS'   // user defined command (client-
>server)
#define  kCSgetPreviewList     'csPL'   // get an IP item preview list
(client->server)
#define  kCSwakeServer         'csWK'   // wake server to scan inputs
(client->server)
#define  kCSgetFileBasedItem   'csFI'   // get a file-based item (client-
>server)
#define  kCSputFileBasedItem   'csFP'   // put a file-based item to input
(client->server)
#define  kCSarchiveCmd         'csAC'   // archive user defined command
(client->server)
#define  kCSfetchChunkID       'csFC'   // fetch archive chunk ID for ID
(client->server)
```

-continued

| | | |
|---|---|---|
| #define kCSgetServerStatus (client->server) | 'csST' | // Fetch server status (client->server) |
| #define kCSgetNextSequenceID (client->server) | 'csNI' | // Get next ID in server sequence |
| #define kCSisServerRunning (client->server) | 'csRS' | // Check if the server is running |
| #define kCSdeclareEvent (client->server) | 'csDE' | // Declare an event has occured |
| #define kCSacquireDBlock | 'csLK' | // acquire a DB lock (drone->master) |
| #define kCSreleaseDBlock | 'csUK' | // release a DB lock (drone->master) |
| #define kCSsendDroneStatus (drone->master) | 'csDS' | // send drone status to master |
| #define kCSdoesIDexist (client->server) | 'csIX' | // Does an item ID exist (client->server) |
| #define kCScueItemFile | 'csQF' | // Cue Item File (client->server) |
| #define kCSCountServerItems (client->server) | 'csCI' | // Count items in the server DB |
| #define kCSAddressToDrone (client->server) | 'csAD' | // Convert IP address to drone ID |
| #define kCSDroneToAddress (client->server) | 'csDA' | // Convert drone ID to IP address |
| #define kCSStandardQuery (client->server) | 'csSQ' | // Standard Query (MitoQuest) |
| #define kCSClientStatusMessage (client->server) | 'csMG' | // Display client status message |

Two of the commands above deserve further discussion here. The 'kCSCollectionCmd' is a collection command that enables all servers in this architecture to inherently support the full suite of server-based collection operations as described in the Collections Patent. This means that all data residing in the server collections is available for transparent use by any client without the need to be aware of the server communications process.

The 'kCSuserCmd' allows the open-ended definition of server-specific custom commands ('kCSarchiveCmd' performs the same function for archive related commands). This mechanism enables the customization of the basic set of server operations in order to support the features and operations that are specific to any particular data or server type. This functionality is preferably invoked in the client via CL_CallCustomFunc( )—see API description below. In the embodiment described below, this capability is used by registering a custom function handler (described below) that packs up the parameters passed to the function into a command block. This command block is sent to the server and the results are "un-packed" by the server as required by the caller. The custom function handler on the client side is registered (via CL_SpecifyCallBack) using the selector 'kFnCustomFuncHdlr'. On the server side, the corresponding server plug-in is registered using 'kFnCustomCmdHdlr'. Each of these are further described below. Within the custom command handler in the server, the pseudo code logic is essentially as follows:

```
static EngErr myServerSideFn(            // custom command handler
            long        aUserCommand,    // I:Command type
            void        *buffer,         // I:The client supplied data buffer
            charPtr     anIdentifyingName, // I:Identifying Text string
            Boolean     wantReply        // I:TRUE if client wants a reply
            )                            // R:Zero for success, else error #
{
    err = 0;
    cmd = (my command record*)buffer;
    switch ( aUserCommand )
    {
        case command type 1:
            extract command parameters from cmd
            perform the custom command
            if ( wantReply )
            {
                rply = (my reply record*)allocate buffer
                siz = sizeof (allocated buffer)
                fill in rply record with results
            }
            break;
        case command type 2:
```

-continued

```
            . . . etc.
        default:
            report "unknown command error"
            break;
    }
    if ( rply )
    {
        SV_SetReply(sp, . . . ,rply,siz);        // send reply back to
the client
        Dispose of(rply);
    }
    return err;
}
```

Thus, in addition to all the logical plug-ins supported for the basic server functionality, this invention allows full control and extension of the functionality of the server itself (in addition to the client). This is in marked contrast to conventional client/server architectures that do not support this level of server customization.

The following is a partial list of the standard logical plug-ins that are supported by the client/server architecture of this invention and a brief description of their purpose. Some callbacks are required but most are optional depending on the nature of a particular server and data type. These logical callbacks are sufficient to implement most kinds of multimedia servers without the need to resort to custom functions. In general, for any given server type, only a very small number of the possible callbacks defined below will be registered, since the server infrastructure provides default behaviors that in most cases perform what is necessary given the standardized environment in which the system operates. Optional callbacks are marked with a '*' below:

| SELECTOR | FN. TYPEDEF | NAME | DESCRIPTION |
|---|---|---|---|
| kFnStatus | ET_IPserverStatus | aStatusFn* | get srvr status kFnDBrecInit |
| kFnDBrecInit | ET_IPdbsRecInitTerm | aDBSrecInitFn* | init db descriptor record |
| kFnDBrecTerm | ET_IPdbsRecInitTerm | aDBSrecTermFn* | clean-up/term DBS record |
| kFnFileDelete | ET_IPfileDeleter | aFileDeleteFn* | delete file fr input fldr |
| kFnIDgetter | ET_DBSidGetter | aDBSidGetterFn | get unique ID fr db recrd |
| kFnDBSattacher | ET_DBSattacher | aDBSattachFn | attach data to db record |
| kFnDBSadder | ET_IPdbsAdder | aDBadderFn* | add item to the database |
| kFnFileProcessor | ET_IPfileProcessor | aFileProcesserFn* | process file in input fldr |
| kFnFileTypeChecker | ET_IsItemFileFn | aFileTypeCheckFn* | check if file of req type |
| kFnCustomCmdHdlr | ET_CustomCmdFn | aCustomCmdFn* | Srvr call on rcpt of cmnd |
| kFnCustomFuncHdlr | ET_CustomFuncFn | aCustomFuncFn* | Clnt call process cust fns |
| kFnPiconMaker | ET_HandleToPicon | aPiconMakerFn* | convert item data handle |
| kFnDBSfetcher | ET_DBSfetcher | aDBSfetchFn | get ET_DBInvokeRec fields |
| kFnExprEvaluator | ET_ExprEvaluate | anExprEvalFn* | evaluate an IP expression |
| kFnFilePathMover | ET_DBSFilemover | aDBSFileUpdateFn* | update data item file path |
| kFnArchiveGetter | ET_ArchiveGetter | anArchiveGetterFn* | get archv creat fldr path |
| kFnArchiveCopier | ET_ArchiveCopier | anArchiveCopierFn* | copy file to an archive |
| kFnArchiveStarter | ET_ArchiveStarter | anArchiveStartFn* | kick-off archive procss |
| kFnArchiveEnder | ET_ArchiveEnder | anArchiveEndFn* | clean up after archiv proc |
| kFnArchivePoller | ET_ArchivePoller | anArchivePollFn* | archiv process complete? |
| kFnNetCopyResponder | ET_NetCopyResponder | aNetCopyRespFn* | srvr copy file over ntwrk |
| kFnNetCopyStarter | ET_NetCopyStarter | aNetCopyStartFn* | init ntwk file cpy at clnt |
| kFnNetCopyIdler | ET_NetCopyIdler | aNetCopyIdleFn* | sust ntwk file cpy at clnt |
| kFnNetCopyEnder | ET_NetCopyEnder | aNetCopyEndFn* | clean up aftr ntwork copy |
| kFnOpAliasResolver | ET_AliasResolver | anAliasResolverFn* | reslve aliaś in outpt pth |
| kFnOpAliasModifier | ET_AliasModifier | anAliasModifierFn* | mod/cust aliaś on archive |
| kFnArchiveRecIniter | ET_ArchiveRecIniter | anArchiveRecIniterFn* | init/archiv db record |
| kFnCustomArchiveCmdHdlr | ET_CustomCmdFn | aCustomArchiveCmdFn* | cust arch comnd srvr call |
| kFnCustomArchiveFuncHdlr | ET_CustomFuncFn | aCustomArchiveFuncFn* | process cust arch fns clt |
| kFnItemInfoGetter | ET_ItemInfoGetter | anItemInfoGetterFn* | get info related to item |
| kFnArchiveInfoGetter | ET_ItemInfoGetter | anArchiveInfoGetterFn* | get arch chnk/dev info |
| kFnArchiveLUNGetter | ET_ArchiveLUNGetter | anArchiveLUNGetterFn* | get list of archive LUNs |
| kFnRepartitionNfyer | ET_RepartitionNfyer | aRepartitionNfyerFn* | notify repartn begin/end |
| kFnDBRecGutsClone | ET_DBRecGutsCloneFn | aDBRecGutsClonerFn* | clone non-flat desc attchs |
| kFnServerIdler | ET_ServerIdler | aServerIdleFn* | call when server is idle |
| kFnFilePutRouter | ET_FilePutRouter | aFilePutRouterFn* | route input fls to drones |
| kFnFileGetRouter | ET_FileGetRouter | aFileGetRouterFn* | rte don't care fl fetches |
| kFnBusyCounter | ET_BusyCounter | aBusyCounterFn* | bus/#clnts load in server |
| kFnQueryHandler | ET_QueryHandler | aQueryHandlerFn* | handle standard queries |
| kFnClientWiper | ET_ClientWiper | aClientWipeFn* | call when clnts strt/stop | kFnStatus—In the preferred embodiment, this function may be used to add additional status information over and above that provided internally by the server environment. For certain specialized servers, additional information may be required in order to fully understand the state of the server. In addition, this plug-in may utilize additional custom option flags in order to return information that may be used functionally by a client for special purposes. Normally status information is simply displayed in the Client/Server Status window and allows a user to determine the status of the system servers.

Referring now to FIG. 5, a sample of a client/server status window 500 is shown.

kFnDBrecInit—If additional initialization for a newly allocated (and zeroed) descriptor record is required, this function may be used to accomplish this. An example might be when descriptors sent to the client have a different format to those used internally by the server plug-ins. In such a case, this function would allow those fields that are valid for the client to be set up from the true descriptor.

kFnDBrecTerm—If additional termination or memory disposal is required for a descriptor record over and above simply de-allocating the descriptor memory (for example if the descriptor contains references to other memory allocated), this function may be used to accomplish this in order to avoid memory leaks.

kFnFileDelete—In many cases, the information relating to a particular item coming from a feed may span multiple files. For example, many newswire feeds produce a separate file containing the meta-data relating to the story content which is held in a text file. The file processing function (see below) can access this additional information. When the server has processed the file and wishes to delete it from the input folder, this function (if present) may be called in order to clean up any other files that are associated with the item and which the server itself is not aware of.

kFnIDgetter—This function is used by the server code to extract the unique ID value from a descriptor record. Since descriptor record structure is normally opaque to the server architecture itself, this function is required in order to determine the ID to which a descriptor refers.

kFnDBSattacher—Many descriptor records contain opaque references to the multimedia content that is associated with the item (for example, the image for an image server) and this multimedia information is packaged up and sent automatically to the client on request. Since descriptor records are opaque to the framework, however, this function is required in order to attach the reference back to the descriptor on the client side.

kFnDBSadder—If an external database, unknown to the server architecture itself, is associated with a given server, this routine can be used to cause the necessary information to be written to that external database at the same time that the server itself adds the item to its own database. This allows external databases (such as relational databases) to be kept in synchronization with the activity of the server. This may be critical in cases where the system is being interfaced to other external systems via the external DB.

kFnFileProcessor—Once a file in the input folder has been identified as being of the correct type for processing by the server, this function may be called in order to actually process the contents of the file in order to extract whatever information is pertinent and make it available to the server. As is well-known to those in the art, the specific processing performed on a file tends to be different for each kind of server and is heavily dependant on the form of the information being processed.

kFnFileTypeChecker—When scanning the input folder for new input, the server may call this function for each file in the folder(s) in order to determine if the file should be processed by the server, ignored, or rejected. In cases where multiple files are required to process a new input, this function would preferably handle this by indicating that the file(s) should be ignored until all required members of the file set have arrived. This behavior is common in commercial feed situations where the arrival of all files relating to a given item may be spread over a considerable time.

kFnCustomCmdHdlr—This is the client side of the custom command functionality described above.

kFnCustomFuncHdlr—This is the server side of the custom command functionality described above.

kFnPiconMaker—This function can be used to create a 'picon' to be shown in the server window 312 whenever a particular item is processed or retrieved by the server. The image shown in the Image Server window 310 is one example, however many server types can usefully display such images such as video servers, map servers, etc.

kFnDBSfetcher—When invoking a client side user interface to display/edit an item of a given type, the system may call this function in order to fill out the fields of the invocation record with the necessary information for the item concerned, passing it the preview data obtained from the server. The additional fields required to invoke a handler for different types may vary and, in the preferred embodiment, it is this function's responsibility to ensure that all necessary fields are filled out.

kFnExprEvaluator—This function may be called by the server in order to evaluate a given "interest profile" against any new item that has been processed. Because the querying functionality available for a particular type may be quite different than that for others (e.g., in an image server "looks like", in a sound server "sounds like"), this functionality would ideally be registered via this mechanism. In this way, the server, through the MitoQuest querying interface, is able to respond to and evaluate type specific queries, not only as part of interest profile processing but also within the generalized querying framework.

kFnFilePathMover—This function may be used to take whatever additional actions (if any) are required whenever the server moves the physical location of a multimedia file from one place to another.

kFnArchiveGetter—This function can be used to determine the network/file path to which the files of a newly created archive batch should be copied. This function is normally registered by the Logical MSS layer and need not be specified unless custom behavior not supported by the Logical MSS layer is required.

kFnArchiveCopier—This function can be used to perform the actual copying of archive chunks to the designated path in preparation for archive burning. This function is normally registered by the Logical MSS layer and need not be specified unless custom behavior not supported by the Logical MSS layer is required.

kFnArchiveStarter—This function can be used to start burning of an archive chunk. This function is normally registered by the Logical MSS layer and need not be specified unless custom behavior not supported by the Logical MSS layer is required. Media burning devices (such as CD-ROMs) frequently require dedicated machines and scripting of commercial software to burn. Also, the burning process may cause the machine involved to lose the ability to communicate for some time. All this logic is supported by the Logical MSS layer via its own registry API (described below).

kFnArchiveEnder—This function can be used to complete the burning of an archive chunk, to handle the transfer of that chunk to the robotic autoloader selected, and to initial flushing of the original data from the output folder cache. This function is normally registered by the Logical MSS layer and need not be specified unless custom behavior not supported by the Logical MSS layer is required.

kFnArchivePoller—This function can be used to poll for archive burn completion. This function is normally registered by the Logical MSS layer and need not be specified unless custom behavior not supported by the Logical MSS layer is required.

kFnNetCopyResponder—The communications model used by the client/server facility for copying multimedia files across the network to/from clients consists of the client calling a 'copy starter' function and then entering a loop calling a 'copy idler' until the transfer is complete at which time the 'copy ender' function is called. At the server end, the 'copy responder' function is responsible for transferring the data. Normally all of these functions are pre-defined by the client/server environment and no additional registration is required. For specialized media types (e.g., video), however, the associated server may wish to override the default suite in order to take advantage of other more appropriate techniques (e.g., video streaming).

kFnNetCopyStarter—See the discussion for 'kFnNetCopyResponder' kFnNetCopyIdler—See the discussion for 'kFnNetCopyResponder' kFnNetCopyEnder—See the discussion for 'kFnNetCopyResponder' kFnOpAliasResolver—When a multimedia item has been moved to robotic storage, an 'alias' file is left in its place within the output folder. This alias file contains all information necessary to allow the server to mount the storage if required and copy the file contents to the client as desired. This function is preferably registered by the Logical MSS layer and need not be specified unless custom behavior not supported by the Logical MSS layer is required.

kFnOpAliasModifier—This function can be used to modify the alias file associated with accessing multimedia data held on robotic storage devices. This function is normally registered by the Logical MSS layer and need not be specified unless custom behavior not supported by the Logical MSS layer is required.

kFnArchiveRecIniter—This function can be used to initialize an archive database descriptor record for a given archive batch. This function is preferably registered by the Logical MSS layer and need not be specified unless custom behavior not supported by the Logical MSS layer is required.

kFnCustomArchiveCmdHdlr—This function provides the server side of the archive custom command capability discussed above. This function is preferably registered by the Logical MSS layer and need not be specified unless custom behavior not supported by the Logical MSS layer is required.

kFnCustomArchiveFuncHdlr—This function provides the client side of the archive custom command capability discussed above. This function is preferably registered by the Logical MSS layer and need not be specified unless custom behavior not supported by the Logical MSS layer is required.

kFnItemInfoGetter—This function can be used to supply additional textual information relating to a given item in the server (as displayed in the "Server Items" maintenance window page).

kFnArchiveLUNGetter—This function can be used to obtain a series of lines of text giving the Logical Unit Number (LUN) information for all the archive devices available for a given server. This function is preferably registered by the Logical MSS layer and need not be specified unless custom behavior not supported by the Logical MSS layer is required.

kFnRepartitionNfyer—This function can be used to take whatever action is required in response to repartitioning of the server output folder. It is often the case that during the life of a server, the mass storage media in the attached robotic storage may be changed (for example upgrading from CD-ROM to DVD) in order to increase capacity or improve performance. When this occurs, the server output folder would preferably be re-partitioned (initiated from the maintenance window). The re-partitioning process involves the steps of retrieving all the batches from the old robotic media to cache, reconstructing a new batch based on the parameters of the new storage device (which probably involves re-allocating the contents of multiple batches to a new batch set), and then re-burning a new copy of the data and moving it to the new storage device. This function can be used to notify external systems of what is going on in cases where this is required.

kFnDBRecGutsClone—This function can be used to perform any special processing required when the contents of a database descriptor record is replicated. If the descriptor is 'flat', this is probably not required, however, in the case where the descriptor contains references to other memory, these external allocations must be cloned also and the new descriptor set up to reference the new allocations.

kFnServerIdler—Many types of servers require regular idle processes to be run and this function can be used to define the activity to be performed during the idling process.

kFnFilePutRouter—When transferring files from a client to the server for processing, in the case of a distributed server cluster, a default algorithm is used to choose which server drone should be selected to handle the new task. The default selection criteria is preferably based (at least in part) on how busy each of the available drones is at the time. If custom routing is required then this function can be used to achieve that as well. Because all server communication occurs via the IP protocols, servers themselves may be widely distributed physically and may have different network bandwidths available to access them. In such cases, it is often preferable to register custom get and put routers.

kFnFileGetRouter—This router function is the converse of the file put router described above. That is it can be used to override the default algorithm used to select a drone to handle the transfer. For example in a distributed video server, it may be advisable to stream from a machine that is physically closer to the client. Defining these algorithms requires consideration and examination of the connectivity state of the robotic storage (if present) to determine which machines have access to the actual data involved.

kFnBusyCounter—Preferably, a server determines how many of its flunkies are busy by examining which ones are still in the process of executing a client command. In certain rare circumstances, however, this may not be appropriate and this function can be used to obtain a more accurate measure. An example occurs in the case of a video server, which is using an external video streaming package (e.g., QuickTime Streaming Server) in order to actually stream the video to the clients. In this case, the load on the machine is actually a function of the number and bandwidth of the streams being sent by the streaming package and so a custom 'kFnBusyCounter' would be used to determine this in order that routing of new streaming tasks would go to the most appropriate drone. This is another mechanism that can be used to impact task routing over and above that provided by the routers described above.

kFnQueryHandler—This function can be used to process standard server queries originating from MitoPlex (see patent ref. 3).

kFnClientWiper—This function can be used to perform whatever resource de-allocation and cleanup is required whenever a server client quits or first registers. This is only necessary if resources outside those manipulated directly by the server and its plug-ins are involved.

Another opportunity for customizing of the standard server behaviors occurs when the server is first created via the CL_DefineDataType( ) API call. One of the parameters to this function is a 'tweak' record that is defined in the preferred embodiment as follows:

```
typedef struct ET_IPserverTweakRec              // record for tweaking server parameters
{
    int32       serverOptions;                  // logical options for server
    short       serverIconID;                   // Icon ID for server view
    short       filesPerAliasFetch;             // files fetched per alias scan
    int32       NeedProgressBar;                // use progress bar for more items
    int32       MaxItems;                       // max # of items sent
    int32       MaxSimultaneousUsers;           // maximum # of simultaneous users
    int32       CheckTime;                      // Scanning interval for new inputs
    int32       LoadIncrement;                  // time between load updates
    int32       ItemChunkSize;                  // # of items in chunk sent from server
    int32       IpServerTimeout;                // Timeout for server on client
    int32       ClientRecvBufferSize;           // size of client item receive buffer
    int32       ServerRecvBufferSize;           // size of server request buffer
    int32       IPClientTimeout;                // Client timeout on server
    int32       favFlunkyStackSize;             // Stack size for favorite flunky
    int32       flunkyStackSize;                // Stack size for other flunkies
    unsLong     minHeapMemory;                  // Minimum heap for server to run
    OSType      startThisServerBeforeMe;        // Control server startup order
    unsLong     idlerInterval;                  // ticks between idler calls
    unsLong     textBackupInterval;             // text backup interval
} ET_IPserverTweakRec;
Where defined server options are:
#define   kServerScansInputFld       0x00000010   // automated scanning of input folder
#define   kServerScansAliases        0x00000020   // automated capture via alias folder
#define   kServerAutoStart           0x00000040   // server should start automatically
#define   kServerHasTimeHistory      0x00000080   // server has a time history field
#define   kAliasesCanAlsoBeToClumps  0x00000100   // aliases can also be to clump files
#define   kSendDescWithPreview       0x00000200   // send descriptor with preview
#define   kDontCreateOutputFiles     0x00000400   // server does not create output files
#define   kArchiveOutputFolder       0x00000800   // archive output folder
#define   kServerStaysInFgnd         0x00001000   // don't automatically move to background
```

| | | |
|---|---|---|
| #define kServerDataIsDistributed distributed | 0x00002000 | // the server's data is |
| #define kUseDefaultArchiveSuite archiving suite | 0x00004000 | // use the default |
| #define kUseArchiveItemsPage items page | 0x00008000 | // use the default archive |
| #define kUseArchiveDevicesPage devices page | 0x00010000 | // use the default archive |
| #define kServerIPsHaveTideMark evaluates IPs | 0x00020000 | // server retroactively |
| #define kServerHasNoDatabase database | 0x00040000 | // This server has no |
| #define kDontOptimizeIPexprs expression | 0x00080000 | // Evaluate every IP |
| #define kPullByCommonPrefix by prefix | 0x00100000 | // aliase fetches grouped |
| #define kNoAutoWindowShow when started | 0x00200000 | // Don't show the server |

By setting up the various fields in the tweak record prior to creating the server, a wide variety of different server behaviors can be customized to the needs of a particular server type. In a similar manner, the parameters of the archiving subsystem associated with a server can be customized via an archive tweak record. An example follows:

```
typedef struct ET_ArchiveTweak
{
    unsLong     archiveBlockSize;              // Block size of the archive volume
    unsLong     archiveChunkSize;              // number of blocks on the archive volume
    int32       sizeOfArchiveDesc;             // size of archive DB desriptor record
    unsLong     mountTimeoutInTicks;           // disk mount timeout
    char        configString[STRINGBUFFSIZE]; // archive configuration string
    char        droneList [STRINGBUFFSIZE];   // list of drone machines
} ET_ArchiveTweak;
```

The descriptions above have referred to the process of creating archive 'batches' for multimedia content and the means whereby those batches are transferred to mass storage. Whenever a server processes an input feed, two types of information result. The first type of information is descriptive information relating to the item itself, when it was captured, where it came from, etc. This information, as discussed above, finishes up in the server database and is the primary means whereby the server can be queried as to its content. Descriptive information like this tends to be relatively small in volume (no more than Gigabytes) and thus is easily handled on the local disk(s) associated with the server. The other type of information is termed multimedia information examples being images, video, maps, sounds, etc. This information is generally encoded in specialized formats and requires specialized software to interpret it. In addition, multimedia information tends to be vastly larger than the descriptive information that goes with it. In this case, the server's job is to transparently handle two diverse access and storage requirements of these two types of information so that when presented to clients, they are unified. Because of the unique requirements of multimedia data it becomes necessary to tightly integrate a sophisticated mass storage system with every stage of server operation and to allow the operation of that mass storage system to be configured on a per-data-type basis. The present invention provides this integration by creating batches of multimedia data that can be archived to mass storage while remaining accessible to the server as a whole. A batch is a set of multimedia items, possibly distributed throughout the hierarchical server directory, whose total size is just less than the storage size defined for the archival media associated with the robotic storage attached to the server. Possible archival media include hard disks, CD-ROMs, optical disks, tapes, DVDs, etc. Each of these media types has a fixed storage capacity, known as the chunk size. The process of building up an archive batch in the output folder involves accumulating the total size of all files that are part of the batch until they add up to enough to warrant the batch being moved to an archive media device. When a batch reaches this stage, it is transferred to an archive location, usually the disk of another machine associated with the server cluster, and then burning or writing of the batch is initiated. Assuming the storage media is a CD-ROM, then the burning process would involve inserting a blank CD-ROM into a CD burner associated with the burning machine and then scripting a commercial CD writing program to actually burn the CD with the contents of the information held in the archive image. When burning is complete, the CD-ROM is removed and preferably placed into the robotic storage device associated with the server. At this point, the media is verified and then the original data for the batch is deleted. More specifically, each file so deleted is replaced by an alias to the location of the archive material in the robot/media. This means that when the server subsequently tries to access the file, it encounters an alias instead and automatically initiates loading of the corresponding media in the robot to a drive associated with the server so that it can be accessed and sent to the client.

In the preferred embodiment, the entire archiving operation occurs automatically (without the need for real time human intervention). This means that in the preferred embodiment, the writer(s) associated with a server as well as the readers are connected to a number of different media devices, all of which are within the robot (so that they can be automatically loaded and un-loaded). Most robotic autoloaders allow a variable number of drives to be installed within them and the connection to each of these drives to be made to any of a number of external computers via SCSI, firewire, USB, or any other logical connection permitting structured communications. The computers that form this cluster (other than the main server machine itself—the master) are referred to herein as drones. In large installations, the drones themselves may have drones and this tree can be repeated to any number of levels. To simplify management of the drones, it is often the case that each such computer is running an identical copy of the environment, including a server for the data type involved. Control over the autoloaders themselves is generally provided via a serial connection, a SCSI connection, or more recently via an Internet/network link. Thus an archiving server tends to be a cluster of machines (possibly physically distributed) all associated with one or more (possibly dissimilar) robots each of which is under the direct or indirect control of the master machine of the cluster.

Referring now to FIG. 6, a sample embodiment of a master server 610 (in this case, a video server) and a cluster of drone machines 615, 620, 625, 630, 635, 640, 645 is shown. In the preferred embodiment, each drone machine 615, 620, 625, 630, 635, 640, 645 has an associated cache area that can store data. When the server 610 chooses a drone which will, for example, stream video to a client 601, 602, 603, not only must it consider which drones 615, 620, 625, 630, 635, 640, 645 are busy and which are not, but also which drones are connected to drives that a robot can control (615, 620, 625, 630, 635) and contain the media for the batch being requested. Additionally, the data required may already be stored in the cache associated with any one of the server's drones and wherever possible access to the data in cache is preferable to accessing it from mass storage. The process of streaming a video thus becomes as follows:

1) Select the drone 615, 620, 625, 630, 635, 640, 645 that will perform the task.
2) Command the associated robot to mount the disk in a drive connected to the selected drone.
3) Command the selected drone to begin streaming from the disk (optionally simultaneously caching).
4) When the stream is done, the disk becomes 'free' and can be dismounted by the robot to make room for another if required.

Similar logical sequences are required for burning media and many other actions that the server needs to perform. The very tight integration between the server state and database(s) and the mass storage implementation is a key benefit of the present invention as it addresses the kinds of problems that occur in large scale systems, such as the distributed video server depicted in FIG. 6.

The mass storage issues described above are just one aspect of the more general problem of creating distributed server clusters that is addressed by this architecture. Even in the absence of mass storage issues, distribution of server functionality across a set of drones may be desirable for performance reasons alone. Consequently in the API descriptions below and in the underlying server implementation, the concept of distribution via the server-drone mechanism is inherent. In a distributed server, the drone servers perform a similar function to the server flunkies described in the single server discussion above and the logic to implement server distribution across the drones is in many ways similar to that described for flunkies. Each drone server is identical to the single server described above, the only difference being that clients of the cluster cannot directly initiate communication with a drone, they must go through the master server in order to have a drone allocated to them. Thereafter, the drone server and the client communicate directly to accomplish the desired task much like the behavior of individual server flunkies. Many of the built-in server commands and functions listed above are associated purely with the business of coordinating activity between drones and the master server.

Another aspect provided by the present invention is the use of "Interest Profiles". As mentioned at the outset, the present server architecture is continuously acquiring new inputs from one or more feeds and examining items extracted from those feeds to see if they are of interest to any of the server clients. In such a case, a client would preferably be notified that a match has been detected so that the client can take whatever action is appropriate. The mechanism for performing this continuous monitoring on behalf of the clients is the interest profile. An interest profile consists of a standard format MitoQuest query (see the Ontology Patent materials incorporated herein) that is applied to each new item as it is acquired rather than searching on all available data. The logic associated with executing these queries within the context of the favorite flunky has been given above. In the preferred embodiment, when clients start up (or when a new interest profile is defined), the client registers all interest profiles/queries defined by the current user with the appropriate server(s) so that while the server is running it has a list of all interest profiles that must be checked against each new item. While startup and interest profile creation are the preferred way of triggering the registration function, many other events could also be defined to trigger the registration process. In the preferred embodiment, when the processing of a new input item completes successfully, the server instructs the favorite flunky to iterate through this list, testing the item just acquired against each query in the list. If a match is found, the server sends a notification to the corresponding client machine indicating that a hit has occurred. On the client machine, the user is notified (either audibly, visibly, or as otherwise dictated by the client) that such a hit has occurred. By taking the appropriate action in the user interface, the data corresponding to the hit can be immediately displayed. Because there may be commonality between the interest profiles defined by different users, the server framework may also be programmed to include logic for eliminating multiple executions of queries that are wholly or partially identical and this behavior can considerably reduce the load implied by interest profile processing. Since most users may be busy doing something else, and will only access data from the server if it matches their profiles, the processing of interest profiles may represent the majority of the computational load on any given server. Because of the heavy loads created by interest profile(s), there is often a need to distribute the process of one or more interest profiles on any given server over multiple drones so that each drone may independently process a part of the incoming feed and execute the associated interest profiles without the need to involve other machines. In addition to registering interest profiles when new items are added to a server, the present invention also permits registration of an "Event", which may be one of many different logical events that relate to the data type involved. For example, users may also register interest profiles on server behavior such as when items are updated, deleted, or even read. This capability has many implications in the monitoring of system usage either for tuning or security purposes.

While it has been stated that the environment being described is in many ways similar to a peer-to-peer architecture, the discussion so far has described the invention purely in terms of servers and clients. In the preferred embodiment, every client machine also has an automatic (preferably invisible) server that is run whenever the client software is active. This server is available to other machines, including servers, to allow them to query and interact with the client. One of the key behaviors provided by this built-in client-server is support for 'publishing' collections that exist in the client machine (see the Collection Patent materials that have been incorporated herein). This built-in server also allows the client to act as a server to any other machine on the network for one or more data types. This is identical to the behavior of machines in a peer-to-peer network except that it is implemented in this case as a special case where the client has a built-in server. In the preferred embodiment, there is in fact no difference whatsoever between the architectural software running in client machines and that running in servers. Indeed, the only difference between the two is caused by system configurations that cause certain machines to initiate as servers and others as clients. This exact match between the software running on the client and that running on the server in a data management framework is unique to this invention and provides extreme flexibility as the network can be rapidly reconfigured.

Client Functionality

The API function list given below illustrates the basic publicly accessible calls available to a client process to support operations within this architecture. As described previously this API can be extended (or truncated) as required for a given server type by use of custom functions or extension of the functions provided below. For additional clarification, the pseudo code associated with the API function list below is provided in Appendix B.

The function CL_GetServerClass( ) may be used to convert a ClientServer data type (an OSType e.g., 'FAKE') to the corresponding server type used when sending to the server. To do this, it switches the four characters in place such that the client type is the mirror image of the server type (i.e., for a client type 'FAKE', server type is 'EKAF'). This distinction is made in order to avoid the possibility of client and server events getting confused in cases where both the client and the server reside on the same machine. Events sent from the client to the server must use the server class, those from the server to the client use the unaltered data type.

The function CL_DoesItemExist( ) can be used to ask a server if a given Item ID exists in its database.

The function CL_DisplayMessageOnServer( ) can be used to display a simple one-line message on the status window of the server. Clients should use this to indicate the problem that caused them to fail to execute a given server request The function CL_GetServerLocation( ) can be used to get the server location (IP address) for a given data type. Returns TRUE for success, otherwise FALSE.

The function CL_DroneToLocation( ) can be used to get the drone location (IP address) for a given server and drone data type. Preferably the function returns TRUE for success, otherwise FALSE The function CL_LocationToDrone( ) can be used to determine if a given server type has a drone server (not necessarily running) at the IP address specified.

The function CL_ClrServerAddress( ) can be used to clear the server address for a given server data type. Preferably, this function is used when a communications error occurs with that server so that the system will continue to attempt to re-establish communication with the server until it returns. TRUE is returned for success, otherwise FALSE. In addition, this routine may be explicitly called before attempting to send a command to a server if it is suspected that the server may have gone off line for any reason. Making this explicit call will force a check before attempting to send any further server commands.

The function CL_SetDefaultNetCopy( ) can be used to specify the default (non-isochronous) file data transfer callback functions to be used by ClientServer when transferring files across the network from server to client in response to a CL_FetchItemFile( ) call. These defaults can be overridden on a per server/data-type basis by calling CL_SpecifyCallBack( ) for the data type concerned. The purpose of this API function is to allow the ClientServer architecture to be modified to utilize whatever file transfer protocols may be most appropriate for the environment and data type concerned. If no alternatives are specified by CL_SpecifyCallBack( ) for a given data type, the default transfer suite specified in this call will be used. The file transfer suite is defined as an abstract set of four procedures that are called by ClientServer as follows:

ET_NetCopyStarter—In the preferred embodiment, this function, called in the client, is passed two strings. The first is the fully expanded file path to the local disk where the output file is to be copied. This file may already exist or the file itself may not yet be created. This function would preferably perform whatever actions are necessary to set-up the transfer at the client end, returning whatever parameters are required by the responder function in the server in the output string parameter. A sample embodiment of a copy starter function is as follows:

```
EngErr myCopyStarter (                              // network copy starter fn (client)
         charPtr         outputFilePath,    // I:lcl output file path to be used
         charPtr         paramBuff,         // O:Outpt param bffr
         long            *context           // O:Context value (if required)
                 )                                  // R:0 for success, else error #
```

ET_NetCopyIdler—In the preferred embodiment, this function, called in the client, is passed the same two strings as the copy starter function, the purpose of this function is to take whatever actions are necessary to sustain the transfer or abort it if it fails. When the copy process is complete (passed or failed) this function would preferably return TRUE in 'allDone', otherwise it should return FALSE in order to request additional calls. The idler function would also preferably be implemented to carefully use the processor time as it will be called regularly by the calling code until such time as it returns TRUE. The idler is not called if the starter function returns an error. If the idler function wishes to pass information to the 'Ender' function, it can do so by modifying the paramBuff buffer contents or the context record. The file transfer process actually completes, not when the idler returns TRUE, but when the ClientServer response is returned from the server. This means that the idler does not need to support the 'allDone' parameter if it does not want to. It also means that the transmission may abort for reasons other than a true response from the idler, so the 'ender' function must account for this. A sample embodiment is provided below:

```
EngErr myCopyIdler    (                      // network copy idler fn (client)
    charPtr           outputFilePath,        // I:Lcl output file path to be used
    charPtr           paramBuff,             // O:Output parameter buffer
    Boolean           *allDone,              // O:TRUE to indicate copy completion
    long              *context               // IO:Context value (if required)
    ET_FileNameModifier fNameModFn           // I:Fn modify fle names - uniqueness
                      )                      // R:0 for success, else error #
```

ET_NetCopyEnder—In the preferred embodiment, this function is called in the client and is passed the same two strings as the copy starter function. The purpose of this function is to take whatever actions are necessary to tear down and clean up a transfer process (either passed or failed). A sample embodiment is provided below:

```
EngErr myCopyEnder    (                      // network copy ender fn (client)
    charPtr           outputFilePath,        // I:Lcl output file path to be used
    charPtr           paramBuff,             // O:Output parameter buffer
    long              *context               // IO:Context value (if required)
                      )                      // R:0 for success, else error #
```

ET_NetCopyResponder—In the preferred embodiment, this function is called by the server and is passed the contents of the paramBuff string created by the ET_NetCopyStarter called by the client and the local file path on the server for the item ID specified in the CL_FetchItemFile( ) call. The responder is preferably called within one of the flunkies of a standard server and as such can maintain control until completion. Once again, in the present invention, this function would manage its processor use so that other server activities can continue simultaneously. A sample embodiment is provided below:

```
EngErr myCopyResponder (                     // network copy responder fn (srvr)
    charPtr           sourceFilePath,        // I:Locl source file path to be used
    charPtr           paramBuff              // I:Parameter buffer from in client
                      )                      // R:0 for success, else error #
```

In the preferred embodiment, the function CL_GetDefaultNetCopy( ) returns the address of the registered default net copy routines. This might be used by custom data type net copy functions that wish to use the basic capability but then add additional features in a wrapper layer.

In the preferred embodiment, the function CL_AddResourceToFile( ) adds the database descriptor structure as a resource to the file in place. A database descriptor record is created and the registered function to initialize a record is called. The file name is extracted from the source string and the item is copied to the name given. The local descriptor is disposed. This function could be used to preassign database descriptors to an item that will subsequently be put in the input folder. This might be performed when simultaneously creating other references to the item which contains a database ID, and must be kept consistent.

In the preferred embodiment, the function CL_GetResourceFromFile( ) recovers the database descriptor resource from a file recovered from a server. It is the opposite of CL_AddResourceToFile( ).

In the preferred embodiment, the function CL_PutInItemInputFolder( ) takes a file full path name and a database descriptor pointer (whatever that may be) and copies the specified file to the used server input directory, adding the database descriptor structure as a resource to the file as it does so. During the process, a temporary file of the same name is created in the temporary directory. Preferably, the name and path of the output file are conveyed to the caller and the handle is saved to the requested temporary file name so that the resource can be added before the copy process (to avoid server interference before completion of process). On completion, the temporary files are deleted.

In the preferred embodiment, the function CL_PutHInItemInputFolder( ) performs a similar function to CL_PutIntemInputFolder( ) except the data for the item is passed in as a handle, not in the form of an existing file. It is often more convenient to have the ClientServer package create the file to be sent automatically.

In the preferred embodiment, the function CL_AddItemUsingServerAlias( ) takes a file full path name and an database descriptor pointer (whatever that may be) and copies the specified file to the used server input directory, adding the database descriptor structure as a resource to the file as it does so. During the process, a temporary file of the same name is created in the temporary directory. The name and path of the output file are conveyed to the caller and the handle is saved to the requested temporary file name so that the resource can be added before the copy process (to avoid server interference before completion of process). On completion, the temporary files are deleted.

In the preferred embodiment, the function CL_GetServerStatus( ) checks to see if the server for a given data type is running. It preferably returns 0 if the server is running else the system error. This function could also be used to check to see if the used server disks are mounted on the client side (if used). In the preferred embodiment, the optionFlags argument has bits for getting the used information as follows: bit kIsServerRunning: if 1 check to see if server is running. If running, bit is CLEARED else it is set to 1 bit kIsDiskMounted: if 1 check to see if necessary server disks are mounted. If mounted, bit is CLEARED else it is set to 1 bit kListServerProblems: if 1 check for any problems that might impede use. If problems, bit is CLEARED else it is set to 1. If a problems exist, a description would preferably be placed in the 'explanation' buffer. For example, the following could be used: bit kGetServerSummaryText: if 1 produce textual server status summary. If supported, bit is CLEARED else it is set to 1. Additional bit masks could also be defined to determine other status information about a particular server.

In the preferred embodiment, the function CL_IsServerLocal( ) returns TRUE if the current machine is the same as that designated as the server machine for the specified type. This means that the server is running on the local copy of the environment. If the server can run on that machine, TRUE is returned, otherwise, FALSE is returned.

In the preferred embodiment, the function CL_DataTypeHasServer( ) returns TRUE if specified data type has an associated server, FALSE otherwise.

In the preferred embodiment, the function CL_GetNextIDFromServer( ) returns the next unique ID in the sequence for a given server.

In the preferred embodiment, the function CL_GetTimeoutTicks( ) given an options word as passed to CL_SendServerCommand( ), this routine returns the time in ticks for the associated communications timeout period. There are three possible values, short, normal, and long. Short and long timeouts can also be obtained by specifying options, such as 'kShortCommsTimeout' and 'kLongCommsTimeout' options respectively.

In the preferred embodiment, the function CL_SendServerCommand( ) is used to send commands from an client to a server for a given data type. Initially it verifies the server that is communicating. The caller's data is preferably added to the host and an Interest Profile fetch/load/unload may be requested. If the operation is successful, a 0 is returned, otherwise an error is returned.

In the preferred embodiment, the function CL_RelayCommandToDrone( ) is identical to CL_SendServerCommand( ) but allows commands to be relayed/routed to a specified drone. Unless implementing specialized protocols or engaging in an extended 'session', there is generally no need to such direct request as the system automatically handled such routing (as described above).

In the preferred embodiment, the function CL_vCallCustomFunc( ) allows any registered custom client function to be called and the appropriate parameters passed/returned. By accessing functionality for a given data type through this mechanism, it becomes possible to remove the requirement for linking the library associated with the type directly to the calling code. This allows calling code to be designed so that if a given data type/library is installed, it will use it (see CL_DoesTypeExist), otherwise it will not. In either case however, the calling code can be built and linked without needing the library to be present. This is a key benefit provided by modular systems. Most often the custom functions will amount to preparing a record to be passed to the data type server using the CL_SendServerCommand( ) function; however, they could also be local functions and need not communicate with the server. Any 'aCommand' values supported by a given type would preferably be defined as char constants (e.g., 'cmd1') so that they are easy to recognize in server error messages etc. Furthermore, these values will preferably correspond one-for-one with a 'command type' to be sent to the server so as to simplify things; the custom server commands and the function designators could also be treated as a single constant 'set'. Libraries may wish to declare macros for each custom function call in order to ensure that the correct number of arguments is passed. In order to process custom functions, a type would preferably define a custom function handler. A sample API is provided below:

```
EngErr myCustomFunc        (             // cstm clnt fn handler
for type 'Crud'
          long             aCommand,    // I: custom command/fn
to implement
          OSType           aDataType,   // I: Must be 'Crud' in
this case
          int32            options,     // I: Various logical
options
          va_list*         ap           // I: Var arg ptr
                           )            // R: Zero for success,
else error #
{
    switch ( aCommand )
    {
        case 'cmd1':                    // params: int32 i1,
charPtr s1, etc.
            i1 = va_arg(*ap,int32);
            s1 = va_arg(*ap,charPtr);
            d1 = va_arg(*ap,double);
            ... etc.
        case 'cmd2':
    }
}
```

In the example above, the calls to va_start( ) and va_end( ) occur within CL_CallCustomFunc( ) and are not used in myCustomFunc. The routine CL_vCallCustomFunc can be used to pass a variable argument list through from the caller to the registered custom client function for the type specified. In this latter case, the calling code is responsible for calling va_start( ) and va_end( ).

In the preferred embodiment, the function CL_CallCustomFunc( ) allows a registered custom client function to be called and the appropriate parameters passed/returned. See CL_vCallCustomFunc( ) for details.

In the preferred embodiment, the function CL_NeedServerComms( ) invokes all initialization functions registered using CL_SetIPinitTermCall( ). CL_xDumpServerComms disconnects from server communications with the specified data type. The routine is preferably called when the IP notifier widget receives its first command. It may also be called by any other widget that uses direct access to server commands. Finally, the handler records and buffer are deallocated and dispossessed.

In the preferred embodiment, the function CL_DumpServerComms( ) invokes all termination functions registered using CL_SetIPinitTermCall( ). It is preferably called when the IP notifier widget terminates. It may also be called prior to termination by any other widget that has called CL_NeedServerComms for the same data type.

In the preferred embodiment, the function CL_SetInitTermCall( ) allows other libraries to register functions to call whenever the IP notifier (or any other widget) uses access to the server for a given data type.

In the preferred embodiment, the function CL_ClrInitTermCall( ) allows other libraries to remove initialization/termination functions registered with CL_SetIPinitTermCall( ).

In the preferred embodiment, the function CL_DefineIP( ) defines/creates/updates an Interest Profile record. First, the function verifies the data type and then checks the record size and adjusts it accordingly. Ultimately, the IP files will be updated and the result is returned. Preferably, the result will be zero for success, and an error code otherwise.

In the preferred embodiment, the function CL_GetIPlistHdr( ) returns the first IP in the IP list, NULL if there is none. By use of repeated calls to CL_GetIPfield, each element in the IP list will be examined.

In the preferred embodiment, the function CL_UnDefineIP( ) deallocates/disposes of an Interest Profile record. The Interest Profile is removed from the server and the link is disposed of. Any associated managers (such as a notifier widget and/or Data Type manager) are informed and the IP name is removed from the recognizer and the IP file is updated.

In the preferred embodiment, the function CL_RegisterIP( ) registers an Interest Profile by name. When an interest profile is 'registered', it becomes known to the environment's IP notifier view/widget. This causes the IP to be loaded into the server and handles the display of any hits that occur for the IP by posting them to the pending views window and the view menu itself. Once an IP has been registered in this fashion, it effectively becomes the property of the IP notifier widget; the widget or code making the registration will preferably not de-register or undefine the IP concerned. This is true even on termination unless for some reason the IP hits can no longer be properly processed when the original registering widget is no longer running. Other than this case, the environment's IP notifier preferably takes over all responsibility for handling and disposing of a registered interest profile.

In the preferred embodiment, the function CL_DeRegisterIP( ) deregisters an Interest Profile by name to prevent subsequent accesses via CL_ResolveIP( ). Initially, the routine checks to verify the IP record. It then informs the widget notifier and Data Type manager and updates the IP files.

In the preferred embodiment, the function CL_ResolveIP( ) resolves an Interest Profile registry name into the corresponding IP record pointer. In the preferred embodiment, the function returns the Interest Profile pointer or NULL for an error.

In the preferred embodiment, the function CL_GetIPfield( ) allows various fields of an Interest Profile record to be retrieved. Zero is returned for success or an error otherwise. The field to be obtained is specified by the 'fieldSelector' parameter, while the 'fieldValue' parameter would be a pointer to a variable or buffer that is appropriate to the field being recovered. An example embodiment of such a field follows:

| SELECTOR | VALUE TYPE | DESCRIPTION |
| --- | --- | --- |
| kIPoptionsFLD | int32 | Value passed in for 'options' when the IP was defined |
| kIPeventTypFLD | int32 | 32 bit event mask |
| kIPdataTypFLD | OSType | The ClientServer data type for this IP |
| kIPurgencyFLD | char | The urgency level for the IP |
| kIPvoiceIndexFLD | char | The voice index to be used when speaking IP name etc. |
| kIPiconIdFLD | short | Icon ID used in Pending Views window to ID this IP |
| kIPcontextFLD | void* | value passed for 'context' when the IP was created |
| kIPnameFLD | char[256] | The name of the IP |
| kIPexpressionFLD | charHdl* | MitoQuest expr. defining the IP match criteria |
| kIPmachineNamFLD | char[256] | machine name IP belongs to (rel for srvrs only) |
| kIPuserNamFLD | char[256] | user name IP belongs to (rel for servers only) |
| kIPnextIPFLD | ET_IPRecordPtr* | Address of the next IP in the IP list |

In the preferred embodiment, the function CL_GetDataTypeOptions( ) obtains the options specified when a data type was created using CL_DefineDataType( ).

In the preferred embodiment, the function CL_FetchItemPreviews( ), when given an array of 'database descriptor records' for a particular client/server data type, retrieves the 'preview' data associated with those records (if available) and attaches it to the records. For example, if the data type were an image, the 'preview' data might be a picon of the image whereas if the data type was text, the preview might be the text itself. Some data types may not have preview data. This function can also be used to obtain the database descriptor records (for those servers that support this) by using the 'kWantDescRecs' option. In this case, only the 'unique ID' field of the descriptor records needs to be set up prior to the call, the entire descriptor will be filled in from the server (optionally also with the preview data). This function serves the dual purpose of associating preview data with existing descriptor records, or of initializing empty descriptor records (other than ID) and optionally the associated preview data. Zero is returned for success, otherwise error number is returned.

In the preferred embodiment, the function CL_IsFileCached( ) determines if a file is already cached locally and if so returns the file path in the cache.

In the preferred embodiment, the function CL_AddFileToCache( ) adds an arbitrarily named file, to the internal database of files that are in the local ClientServer file cache. This function is preferably called automatically by CL_FetchItemFile( ), in which case the file names will conform to the syntax returned by CL_GetCacheFilePath( ). If the file is being moved by some other means, however, this function can be called after the file has been moved in order for the moved file to subsequently be recognized as cached. In this latter case, the file name can be arbitrary. If a subsequent call attempts to access the file at the location specified and it is no longer there, CL_FetchItemFile( ) will re-fetch the file from the server and delete the missing file from the database of cached files, adding the new one.

In the preferred embodiment, the function CL_AddDataToCache( ) adds an arbitrarily memory resident data handle, to the internal database of files that are in the local Client-Server file cache. This mechanism is intended to allow the ClientServer cache to be used to store additional data types that do not have a corresponding ClientServer server associated with them. To make use of the facility, a unique data type and an item ID within that type must be supplied. This function takes the data handle supplied and saves if to a path within the cache that is constructed based on the data type and ID. Items saved in this manner can be manipulated using the other ClientServer cache functions in this package. The only difference is that since there is no corresponding server, only items in the cache will actually be accessible.

In the preferred embodiment, the function CL_ScanCacheForNewFiles( ) scans the cache all folders (recursively) referenced from the main cache folder looking for "CachedFileDB" files. When it finds one, it opens it and attempts to add and files referenced by it to the main "CachedFileDB" file of the cache folder. What this means is that to add a previously saved cache to the current one (e.g., burned onto a CD-ROM and then referenced via an alias in the main cache), all that is required is invocation of this function. In the preferred embodiment, this function is called automatically following system startup and can also be initiated from the Administration window after a new alias has been added to the cache. This makes it relatively trivial to augment a machine's cache with additional cached files.

In the preferred embodiment, the function CL_PurgeCache( ) is called regularly by the environment. If it discovers that the disk(s) containing the cache folder is becoming full, it purges old files from the cache until disk utilization falls below acceptable limits. This routine could be called explicitly to ensure a certain amount of free disk space. Files are purged starting with the oldest and file purges could be further limited by other limits. For example, this function could be implemented such that files less than 2 hours old are not purged unless the purge ratio is set to 100%.

In the preferred embodiment, the function CL_DeleteFileFromCache( ) deletes a file from the ClientServer file cache and removes its entry from the cache database. The file may be specified either by DataType and itemID or by file path. For obvious reasons, the former is considerably more efficient.

In the preferred embodiment, the function CL_GetCacheFilePath( ) returns the file path that CL_FetchItemFile( ) would use to cache the corresponding data if it were requested. This function could be used in the event that the file is placed into the cache by some other means while still permitting retrieval by CL_FetchItem( ).

In the preferred embodiment, the function CL_CueItemFile( ) causes a server to take whatever action is necessary to cue a file for subsequent playback, this could include mounting the corresponding archive 'chunk' in the server (or one of its drones). The main purpose of the 'cue' command is to allow clients to predict that an item file may be requested by the user and thus begin the process of loading it in order to save time should a subsequent file fetch be issued. In the preferred embodiment, unless the 'aNetworkFilePath' parameter is set to non-NULL, the cue command returns immediately. By setting 'aNetworkFilePath' non-NULL, the caller will wait until the cue operation is complete at which time the full network path where the file was placed is known. Since servers are free to move media that is not currently in use in the preferred embodiment, the path returned should only be considered valid for a short period of time (i.e., seconds). Otherwise, the path should be verified again by issuing a fresh 'cue' command.

In the preferred embodiment, the function CL_FetchItemFile( ) can be used to move the contents of a file-based item to a local file. It returns zero for success, otherwise an error number.

In the preferred embodiment, the function CL_DefineEventType( ) allows the names and bit masks for data specific server events to be defined to the server so that Interest Profiles and searches can be specified in terms of these events. Certain event types are predefined by the standard server package, notably:
  'kMatchItemAdd'—"Add" triggered when a new item is added to the data set
  'kMatchItemWrite'—"Write" triggered when an existing item is written to
  'kMatchItemDelete'—"Delete" triggered when an item is deleted
  'kMatchItemRead'—"Read" triggered when an item is read/accessed Additional data specific actions can be defined using this function and then used in creating Interest Profiles. The caller supplies a textual description for the event (such as those in quotes above) together with a bit mask specifying which bit (0 . . . 23) is to be used to specify and check this condition. By making a series of such calls, a complete description of all available event types for a given server and data type can be defined. TRUE is returned for success and FALSE otherwise.

In the preferred embodiment, the function CL_MaskToEventType( ) translates an (single bit) event type mask associated with a ClientServer data type into the corresponding descriptive string. Only the lowest bit set in the mask is extracted. The association between these bit masks and the corresponding event type is made by calling CL_DefineEventType( ). TRUE is returned for success, otherwise FALSE is returned.

In the preferred embodiment, the function CL_EventTypeToMask( ) translates a descriptive event type string to the corresponding mask for a given ClientServer data type. A search is performed for the exact match to the string. The association between the bit masks and the corresponding event type is made by calling CL_DefineEventType( ). Success returns TRUE, otherwise FALSE is returned.

In the preferred embodiment, the function CL_ListEvents( ) returns an alphabetized, carriage return (<nl>) separated list of all the IP event types supported by the server for given data type. Initially the data type is verified. Once a string list is obtained, it is sorted alphabetically. The descriptive field is extracted and the string list unsorted. NULL is returned for an error, otherwise handle to event type list.

In the preferred embodiment, the function CL_GetServerItemCount( ) returns the count of the number of items for a given server.

In the preferred embodiment, the function CL_DeclareEvent( ) can be called either within a server or from a client in order to declare that a specific event has occurred for the data type concerned. The effect of making such a declaration is to request the server to check all interest profiles to evaluate if any of them should trigger as a result of the declaration and if so to inform any interested clients (as described above). Interest profiles can be defined based on the action that the interest profile is interested in. One such action is "Add" which occurs automatically when a server adds an item to the server database. In the preferred embodiment, predefined actions such as "Add" do not use explicit calls to CL_DeclareEvent( ) since these are made automatically by ClientServer code.

In the preferred embodiment, the function CL_SpecifyCallBack( ) can be used to specify one of the various callback functions used by the ClientServer architecture. See the description above for a full list of the possible call-backs that can be registered and their purposes.

In the preferred embodiment, the function CL_ObtainCallBack( ) can be used to obtain the address of one of the various callback functions used by the ClientServer architecture. Some callbacks are used, others are optional depending on the nature of a particular server and data type. See CL_SpecifyCallBack( ) for details.

In the preferred embodiment, the function CL_DefineDataType( ) allows the data type and server information for a particular server data type to be defined. Using this information, this function is able to construct appropriate dialogs, determine server state, and communicate with the server both as part of Interest Profiles and also for retrieving data of the type given. Initially, data type verification is performed and subsequently the new record is added to the linked list and tweaking parameters are handled. A string list is created for the event types and all the tags are set equal to the first field. The value TRUE is returned for success, otherwise FALSE is returned.

In the preferred embodiment, the function CL_StandardHitListQuery( ) can be used to issue a query command (kCSStandardQuery) for the express purpose of obtaining a standard hit list from a specified server or from multiple servers. The hit list obtained is in the form of a standard hit list (of type ET_HitList). Preferably this function is invoked invisibly via the MitoPlex API, however, it could also be used to allow more specialized direct uses.

Server Functionality

The API listing below gives the basic suite of public calls available for customizing code that is running within a server or which is manipulating server state directly. Most of these calls will fail if invoked outside the context of a server or one of its drones/flunkies. Again, while the following is the preferred embodiment, any number of different or related API calls could also be provided. For additional clarity, Appendix B includes a sample pseudo code embodiment of the header files associated with such functions (which are described below).

In the preferred embodiment, the function SV_ShowFlunkyWindows( ) ensures all flunky windows are showing.

In the preferred embodiment, the function SV_WidgetModalEnter( ) and SV_WidgetModalLeave( ) are called as a widget modal window is show or hidden. These function allow the client server package to take certain specialized actions in the case where the widget modal belongs to a flunky of a standard server. More specifically, in the preferred embodiment, the action taken is to register a symbolic function so that the widget modal will always be re-shown when the main server window is brought forwards. This function prevents loss of such a window when clicking on another widget.

In the preferred embodiment, the function SV_ServerInitComplete( ) allows flunky threads within a server to determine if the main server thread has completed initialization yet. It is often important to ensure that no other activity occurs before the main thread has established a consistent logical environment within which such activity can take place.

In the preferred embodiment, the function SV_AllServerInitsComplete( ) allows code in any context to determine if all servers in the current machine have completed their startup sequence. If there are no local servers, this routine returns true immediately.

In the preferred embodiment, the function SV_SetArchiveSuite( ) is used to specify the default suite of functions to be used for archiving. In the preferred embodiment of this function, a standard archiving software suite is registered using this function so that individual servers need not consider the requirements of archiving other than to set the necessary option. Specialized archive suites could also be registered on a particular server.

In the preferred embodiment, the function SV_PutInItemRejectFolder( ) takes a file path and moves the specified file to the Reject directory, optionally deleting the source file. The file name is extracted from the source string and concatenated to the directory where the file's existence is verified.

In the preferred embodiment, the function SV_GetServerFolder( ) can be used to obtain the full file path to one of the four server folders. Return Zero for success, otherwise error number.

In the preferred embodiment, the function SV_GetArchiveTweakRecord( ) returns a pointer to the archive tweak record for a given server type. The result is a pointer to the archive tweak record, or NULL in the case of an error.

In the preferred embodiment, the function SV_GetTweakRecord( ) returns a pointer to the tweak record (the tweak record should not change when the server is running) for a given server type. The result is a pointer to the tweak record, or NULL in the case of an error.

In the preferred embodiment, the function SV_GetCurrentBatchDetails( ) is used to obtain details of the batch currently being processed by a given server. This function is preferably called from within server plug-in.

Given the size of the resource and data forks of a file and the block size for the target device, SV_GetBlocks( ) returns the number of blocks that will be consumed by the file on that device.

In the preferred embodiment, the function SV_FetchArchiveChunkID( ) fetches the archive 'chunk' ID associated with a given item in the server. For example if the server archiving device includes a CD-ROM based device, the chunk ID would be a unique (within this server) reference to the particular CD-ROM on which the item resides. The chunk ID value returned can be utilized in subsequent archive specific server commands.

In the preferred embodiment, the function SV_Index2FolderName( ) creates a base 36 folder name string encoded into 5 characters as follows "@XXXX" where each 'X' character can be 'A' to 'Z' or '0' to '9'. In the preferred embodiment, the function SV_FolderName2Index( ) can be used to convert these folder names back to a numeric value. The reason for such a function is avoid limits on the number of output folders that can be created by the ClientServer package. If a decimal encoding were used, only 10,000 output/archive folders would be allowed. By using base 36 encoding, the number is nearly 1.7 million. Again, additional or modified encoding schemes could also be used depending upon the application.

In the preferred embodiment, the function SV_FolderName2Index( ) creates a base 36 folder name string encoded into 5 characters as follows "@XXXX" where each 'X' character can be 'A' to 'Z' or '0' to '9'. In the preferred embodiment, the function SV_FolderName2Index( ) can be used to convert these folder names back to a numeric value. The rationale for this approach is set forth above.

In the preferred embodiment, the function SV_DefineDroneType( ) is used to define a 'drone' data type. A 'drone' data type is a data type for which the server is not usually directly addressed but is associated with a primary data type server. This is similar to the way that flunkies are associated with a server. Preferably, drone servers are treated exactly like primary server flunkies except that drones servers often reside on another machine. This may be necessary if the task being assigned is very computationally intensive or if the drone is being used to access and deliver data from storage devices that are actually connected to the drone machine, not the prime. As an example, a video server might consist of a single prime server with a number of drones, each capable of sustaining a certain number of streams direct to the original clients, but all of which are actually accessed via requests to the prime. In actual operation, the primary server can assign a task to one of its own flunkies, which in turn can re-assign the task to a drone server, hanging up until the drone sends a completion message. A complete API would also preferably provided for server plug-ins in order to search and assign available drones of a primary server. In theory, drone servers themselves could have drones.

In the preferred embodiment, the function SV_CountDrones( ) returns a count of the number drone servers/data types that are associated with a given master type.

In the preferred embodiment, the function SV_GetDroneType( ) returns the drone type corresponding to a given index within the drone types list of a given master data type.

In the preferred embodiment, the function SV_IsAssociatedDroneType( ) returns true if the specified drone type is associated with the current server, false otherwise.

In the preferred embodiment, the function SV_FindLeastBusyDrones( ) returns the least busy drone(s) out of a list of drones.

In the preferred embodiment, the function SV_GetStatusWord( ) returns the status word corresponding either to a server itself, or to a given index within the drone types list of a given master data type. Servers can declare their 'status', which in the preferred embodiment is a 16-bit flag word, by calling SV_DeclareStatus( ). In the case of drones, this status is relayed to the master where it can be examined using this routine. This feature is intended to support applications where various drones of a server may go in and out of certain 'states' that need to be communicated to plug-ins in the master (e.g., routers etc.). The preferred use of the status word is as an array of bits where a server would update any state bit individually. An example follows:

```
status = SV_GetStatusWord(myDataType,-1)    // get current status
SV_DeclareStatus(status | aNewStatusBit)    // set the bit we're concerned with
```

In the preferred embodiment, the function SV_DeclareStatus( ) sets the contents of a servers status word. See SV_GetStatusWord( ) for additional details.

In the preferred embodiment, the function SV_MakeServerView( ) adds an instance of the built in 'IP Server' widget to a view. This widget preferably provides multi-user server capabilities for a particular data type, including support for notification of clients based on the triggering of interest profiles. Initially the data type is verified. The server view is created in such a way that it cannot be halted other than by software termination. The return value is the launch code of the created view or 0 for error.

In the preferred embodiment, the function SV_ArchiveThisFile( ) returns TRUE if the specified file in the server output folder should be archived, FALSE if not. For non archiving servers, the result is always FALSE. For archiving servers, the result may be FALSE in cases where archiving has been turned off, such as be using SV_SetFolderArchiveEnb( ) for some folder ancestral to the file.

In the preferred embodiment, the function SV_InitiateBatchScan( ) initiates an output folder scan for the purpose of sending the files in the specified batch to a burn device.

In the preferred embodiment, the function SV_PerformArchiveBurn( ), through various registered archiving callbacks, performs an archive burn sequence for the batch ID specified.

In the preferred embodiment, the function SV_GetStatePtr( ) can be called from any context to discover the local server state pointer for a given data type. This is not the preferred methodology other than rare cases.

In the preferred embodiment, the function SV_GetClientOptions( ), when called from within a server flunky, returns the options specified on the current command at the time of the call to CL_SendServerCommand( ). In addition to the standard options bits for this function, the preferred embodiment also provides eight custom option bits (starting from 'kCustomCmdOption1') that can be used to pass parameters to custom command functions in the server, for example. This function is intended to allow retrieval of these options.

In the preferred embodiment, the function SV_GetDatabasePtr( ) can be called from within a standard server and gets the database record pointer address associated with the specified server. This pointer may be used by ClientServer callbacks in order to make calls to the Database API to manipulate the ClientServer database directly.

In the preferred embodiment, the function SV_GetArchiveDBPtr( ) can be called from within a standard server and gets the database record pointer address associated with the archive for a specified server. This pointer may be used by ClientServer callbacks in order to make calls to the Database API to manipulate the ClientServer archive database directly. If the server does not support archiving, the return value will be NULL.

In the preferred embodiment, the function SV_AddArchiveBatchID( ) can be called within an archiving server (or its plug-ins) to add a new archive batch to the archive DB and return its batchID.

In the preferred embodiment, the function SV_SetFolderArchiveEnb( ) can be used to enable/disable archiving for a specified server output sub-folder (and any folder hierarchy it contains). The routine (as presently implemented) is only valid when called from within a standard server or one of its flunkies. In certain situations, especially those where a server output sub-folder contains a limited set or may be subject to frequent updates, it is often desirable to turn off archiving for that portion of the server hierarchy since, once archived, updating of the content may no longer be possible (depending on the nature of the archive device-such as 'write once' devices).

In the preferred embodiment, the function SV_SetupMessage( ) can be used by standard server callback functions, and internal environment code, to display messages both in the momentary activity display in the server window, and also in the time history display (if that option is enabled). If the 'log' parameter is true, the string is added to the time history window, otherwise it is not. This is useful when code displays status messages that you do not wish recorded as well as exception condition messages that you do. In the preferred embodiment, this function behaves just as an 'sprint'; that is, string substitution parameters may be specified as "normal" (up to a total message size of 256 characters). The flunky index and state pointer parameters necessary for this call may also be obtained by calling SV_GetStatePtr( ). In the preferred embodiment, if the 'kServerHasTimeHistory' option is not selected when the server is created, the time history information is not recorded but all strings are still displayed to the momentary display (such as in the server window).

In the preferred embodiment, the function SV_PingClient( ) can be called from within a server context and will look for the current client widget, on the appropriate machine, for the calling flunky. If the client machine or widget cannot be found, this function returns FALSE, otherwise it returns TRUE. No actual communication with the client widget occurs; rather, its presence is simply sensed. In cases where a server flunky may stay connected to a client for long periods of time and where there may be no obvious activity from the client, it is wise to ping the client on some regular basis (e.g., once a minute) so that if the client has actually gone away, the server process can be aborted and any allocated resources released.

In the preferred embodiment, the function SV_AutoPingClient( ) causes the client associated with a flunky to be auto-pinged at the specified interval. If the client goes away, the specified wake handler will be called so that the flunky can take whatever action is appropriate to tear down allocated client resources.

In the preferred embodiment, the function SV_SetPicon( ) displays (or erases) a new picon in the server picon window.

In the preferred embodiment, the function SV_SendToClient( ) can be called within an non-favorite flunky of a server in order to send a message to the client that caused the flunky to be instantiated. This permits client notification of the progress of a request etc. A reply to this message will generally not be returned from the client unless the reply is handled in another flunky. In other words, in the preferred embodiment, this is a one-way communication scheme.

In the preferred embodiment, the function SV_ForwardCommand( ) can be called from within a flunky of an existing server to forward a command received unmodified to another server. This mechanism allows one server to server as a router to other servers since the command is sent by 'proxy' and thus the reply goes back to the originating client, not to the caller of SV_ForwardCommand( ). Commands can be re-routed multiple times using this proxy mechanism thus allowing the creation of large networks of servers where the topography of a particular server cluster is hidden from external clients via a 'router' server. The ability to re-route commands by proxy (in conjunction with the server 'drone' mechanism) is important to the creation of servers that are implemented as a 'cluster' of machines all of which appear as a single logical server.

In the preferred embodiment, the function SV_PrepareFileForXfer( ) can be called to prepare a file for transfer to a client without actually doing the transfer. If files are being transmitted to the client by some other means, this function could be called to ensure the file is available/mounted before you begin the transfer. In the preferred embodiment, this function can be called either in the master server or a drone and in the former case may route the original command to the selected drone (returning −1). For these reasons, the code that calls this function would preferably appear in both the drone and main server custom command functions.

In the preferred embodiment, the function SV_ReplaceCommand( ) can be called prior to a call to SV_ForwardCommand( ) in order to alter the actual command that is being forwarded. The original command is disposed and replaced by the new command supplied, a subsequent call to SV_ForwardCommand( ) will cause the new command to be forwarded. Parameters are identical to CL_SendServerCommand( ) except for the first two and the fact that 'aDataType' is not supplied since it is implicitly the data type of the enclosing server.

In the preferred embodiment, the function SV_GetOptions( ) is only valid within the context of a ClientServer server or it's flunkies and callbacks. SV_GetOptions( ) returns the options parameter specified when the server way created (See SV_MakeServerView), SV_SetOptions( ) allows the options to be dynamically modified.

In the preferred embodiment, the function SV_SetOptions( ) is only valid within the context of a ClientServer server or it's flunkies and callbacks. SV_GetOptions( ) returns the options parameter specified when the server way created (See SV_MakeServerView), SV_SetOptions( ) allows the options to be dynamically modified.

In the preferred embodiment, the function SV_GetContext( ) returns the value of the server context field set by a prior call to SV_SetContext( ). In general, if server flunkies or callbacks need a global context record, a server function will be registered (using SV_SetIPinitTermCall) in order to create the context when the first widget within the server is created. Similarly, another function is preferably registered to terminate the allocation. Thereafter, any subsequent callback code may obtain the context by calling SV_GetStatePtr( ) to obtain the server state pointer, and then SV_GetContext to obtain the context value. The value of the context field is returned.

In the preferred embodiment, the function SV_SetContext( ) sets the value of the context field within a server state record. This context value may be obtained from any flunky or callback function by calling SV_GetContext( ).

In the preferred embodiment, the function SV_GetArchiveContext( ) returns the context value associated with the archiving process for a given server. A separate context location provided for archiving (in addition the that provided by SV_GetContext) in order to ensure that the normal context location is still available for custom use by each server independent of the archiving software registered for that server.

In the preferred embodiment, the function SV_SetArchiveContext( ) sets the value of the context field within a server state record. This context value may be obtained from any flunky or callback function by calling SV_GetContext( ).

Calls to SV_SetReply( ) are preferably made within a custom command handler callback function (ET_CustomCmdFn) for a ClientServer server. In the preferred embodiment, the function is used to set a pointer to a block of data to be returned to the client as the reply. If the 'wantReply' parameter to the ET_CustomCmdFn function is FALSE, SV_SetReply should not be called since the reply data will simply be discarded. Replies may be passed back to the client either synchronously or asynchronously and each reply is uniquely tagged using a value supplied by the original caller. In the preferred embodiment, the buffer supplied will be duplicated and attached to internal server structures so that it may be a local variable. Its size may be anything from a single byte up to the maximum size of the client receive buffer. The return value for success is Zero, otherwise an error number is returned.

In the preferred embodiment, the function SV_SetItemListReply( ) may be called from a server callback function. Its purpose is to cause the reply event from a custom server command to be an item list (see SV_RequestItemsList( )). This call will fail if the client did not specify that it was anticipating an items list reply by setting the 'kResponseIsItemList' option. The item list sent will consist of a series of descriptor records as defined by the data type involved, however, if necessary, the item list will be sent as a series of 'chunks' of items which are automatically reconstructed at the other end into a contiguous list. This mechanism should be used in any case where the number of items resulting from a callback function is unknown and might possibly overflow the client receive buffer if an attempt to send them as a normal reply record were made. By using this scheme, it is possible to keep the size of the reply buffer that must be allocated by each client to a reasonable value even if hundreds or thousands of items may be sent in response to a given command. The client end code (presumably in a custom function procedure), issues the appropriate command with the 'kResponseIsItemList' option set, the data appearing in the reply record will consist simply of a handle to the item list. The 'aMarkupFn' parameter may be used to specify a function that is called for each descriptor/data item in the list (after it has been recovered but before it has been sent). This function is passed the 'aMarkupContext' to allow it to establish context, its purpose is presumably to alter the descriptor or data record being sent in whatever way might be appropriate given the context of the call. Thus, if there is additional information to be inserted into the descriptor record or data for this command type, the 'aMarkupFn' function can be used to do so.

In the preferred embodiment, the function SV_DontWaitForMe( ) can be called from a server flunky when that flunky is engaged in some lengthy action which should not inhibit normal operation of the 'favorite flunky' (which is responsible for acquiring and processing new input from the input folder). In the preferred embodiment, the default behavior of the invention is to inhibit activity by the favorite flunky whenever there is any outstanding activity for other flunkies. This is based on assumption that providing rapid responses to client requests is more important than it is to acquire new items for the server database. Note that if a flunky calls this function, the server will not wait for that flunky when being 'stopped'. The same is true when the environment is 'Quit' so if this causes a problem for the flunky, it should either not call this function, or should register a termination function in order to perform the necessary cleanup.

In the preferred embodiment, the function SV_GetClientLocation( ) can be called from a server flunky (other than the favorite flunky) or callback code invoked from such a server flunky. In the preferred embodiment, the function returns the network path of the client machine that the flunky is currently handling.

In the preferred embodiment, the function SV_GetOutputFilePath( ) can only be called from within a standard server. It gets the partial output file path (if any) for a given item ID. In order to construct the full file path, this partial path must be appended to the output folder base path which may be obtained using SV_GetServerFolder( ).

In the preferred embodiment, the function SV_DefineMaintenancePage( ) can only be called from within a standard server. Using the 'book' API, this routine allows the names, handler functions, etc. for custom views/pages in the server maintenance (or wrench) window to be specified to the ClientServer package. In order to add a new page to the maintenance window, its name must be specified and an appropriate handler function supplied. The ClientServer itself registers one page called "Server Items" which allows limited examination of and control over the state of the items contained in the server. In addition, if archiving is enabled, an "Archive Items" page is automatically registered, which allows examination and manipulation of the 'chunks' of storage (e.g., CD-ROMs) that make up an archive. The "Server Items" and "Archive Items" pages are supported by additional ClientServer APIs which allow servers and archive suites to register iconic buttons and the corresponding action functions so that it is possible to provide all the basic server manipulation functionality without having to explicitly write any UI code. Often, archive suites will also register an "Archive Devices" page, which allows explicit access to, and control over the autoloader device(s). Other custom server types may wish to register a "Server Status" page which can be used to display additional status over and above that provided by the standard window. Other uses of the maintenance window for purposes unique to a particular custom server are envisaged. TRUE is returned for success and FALSE otherwise. A typical maintenance page handler might appear as follows:

```
Boolean myMaintPageHdlr  (
        ET_CSStatePtr        ip,          // I:Server state pointer
        charPtr              pageName,    // I:name of the page to be handled
        ET_UIEventPtr        anEvent,     // I:UI event/msg to be handled
        short                action,      // I:Action (see notes)
        ET_ControlRef        aControlH    // I:Control handle for page
                                      )   // R:TRUE if the event was handled
{
    if ( action == kHandleUIevent )
        switch ( anEvent->messageType )
        {
```

```
        case kEventMsg:              // Raw event received
            ...
            break;
        case kWindowMsg:              // Window or control hit
            switch ( anEvent->controlLabel )
                ...
            break;
        }
    else
        ...
        return YES;
}
```

Only one view/page is visible in the maintenance window at any given time. When the user clicks on the 'wrench' control in the server main view, the maintenance floating window would be shown. In the preferred embodiment, control label numbers below 100 are reserved exclusively for ClientServer use within the maintenance window. The title of the view control you supply must match the 'page-Name' parameter exactly and the view's dimensions must be 408h*168v.

In the preferred embodiment, the function SV_GetActiveMaintPage( ) allows you to obtain the maintenance page that is currently active (if any).

In the preferred embodiment, the function SV_GetPageRegistry( ) gets the page registry for the maintenance window. The ClientServer maintenance page capability supports the ability to create an arbitrary ET_StringList registry associated with each page of the maintenance window. This capability is available for custom use, however, in the case of the built in maintenance pages (i.e., "Server Items" and "Archive Items"), the registry is used to register custom buttons, icons and action functions associated with the page. See SV_DefineItemPageButton( ) for details. When the maintenance page is destroyed, the corresponding ET_StringList that makes up the registry is also deleted. The string list is automatically set to be the context value for the book page, i.e., it will be passed to any page handler in the context field, replacing any value set in the UI_DefineBookPage( ) call. ClientServer initially sets the context value to zero when creating a page via SV_DefineMaintenancePage( ).

In the preferred embodiment, the function SV_DefineItemPageButton( ) is associated with the predefined "Server Items" and usually with the "Archive Items" pages in the server maintenance window. It utilizes the registries (see SV_GetPageRegistry) associated with these pages to store the details of a series of buttons that are displayed whenever a given item in the list of server/archive items is selected. For other maintenance pages, the registry may be used for other purposes and calls to this routine may not succeed. This routine inserts entries into the ET_StringList (using the kStdDelimiter delimiter) where the field contents are as follows: "buttonName" kStdDelimiter "buttonHelp" kStdDelimiter "buttonType" kStdDelimiter "buttonData" kStdDelimiter "buttonHandler" You may recover any of this information later using SV_GetItemPageButton( ). In particular, you should ensure that during termination of your page, you dispose of any memory associated with the 'buttonData' handle since this is not automatic. You generally define the possible set of buttons for a page on the 'kInitializepage' call to the page handler, and dispose of the button data on the 'kTerminatePage' call.

In the preferred embodiment, the function SV_GetItemPageButton( ) recovers the information for a button associated with a maintenance window registry. See SV_DefineItemPageButton( ) for details.

In the preferred embodiment, the function SV_GetFavoriteFlunkyID( ) can be called from anywhere within the context of a server 'cluster' and returns the widget ID of the favorite flunky of the cluster. This allows code running in other flunkies or the main widget (especially in maintenance pages) to issue commands to the favorite flunky using wake events. In this manner the maintenance page code can cause lengthy operations to occur in the favorite flunky context thus avoiding hanging up the server itself.

In the preferred embodiment, the function SV_CustomCommandFavFlunky( ) is used to issue a command to the favorite flunky of a ClientServer server while ensuring that commands do not overrun the flunky and maintaining all necessary server states. This function can be used within a ClientServer server cluster.

In the preferred embodiment, the function SV_CustomCommandFlunky( ) can be used to issue a custom command call to any available flunky (other than the favorite flunky) of a ClientServer server. This function can be used within a ClientServer server cluster. The call is asynchronous and no reply is anticipated. This routine would preferably only be used for commands that are synthesized internally to the server, not for relaying commands originating from a client. The purpose of using this routine (rather than creating a separate non-server flunky explicitly) is that any flunkies created in this manner become part of the server accounting for how many 'clients' it is busy handling. This behavior may be necessary if the original command handler must complete and reply to the client but the processing of the clients command is not yet fully complete.

In the preferred embodiment, the function SV_GetDefaultQueryFunc( ) returns the address of the default query handler function provided by the server package. For example, in cases where a custom query handler function has been registered for a server, it could perform code similar to the following:

```
{
    if ( queryText starts with custom flag sequence (e.g., "SQL:")
            or 'funcName' is our special type)
        hitList = perform the custom query using whatever method is
        applicable
    else
        qFn SV_GetDefaultQueryFunc( )
        hitList = qFn( . . . )
    return hitList
}
```

Alternatively, the standard query could be allowed to execute and modify the resultant hit list.

Logical Mass Storage Functionality

Although the server API allows the direct registration of all plug-ins necessary to handle robotic mass storage, in the preferred embodiment the Logical Mass Storage layer also provides these plug-ins for an archiving server. This is primarily because the complexity of actually implementing mass storage correctly means that a higher level, simpler API is required that performs all the MSS functions and requires only the registration of a number of 'driver' plug-ins in order to allow control of a new robot or media type. A number of support functions are provided to make the definition of new robotic drivers a relatively easy process. To do this, the abstraction defines a robotic storage device to be comprised of a number of standardized components, and the registered driver maps the actual robotic arrangement into this logical model. In the preferred embodiment, a storage robot is logically (though not necessarily physically) comprised of the following:

Media Slots—Each robot has some number of slots into which media can be placed and from which the media can be retrieved. Slots may be either empty or full depending on whether they contain media at the time or not. If media exists in a slot, it may be either blank (i.e., not yet written) or not. Many robots divide slots into a set of shelves and thus the driver must convert the logical slot number into an X,Y form in order to address the actual physical arrangement of slots within the machine.

Shelves—As mentioned above, media slots may be organized into groups or shelves. Some robots support the removal and re-insertion of an entire shelf containing many media items. In certain robots, media is held in caddies. In this case, the concept of a shelf is mapped to the caddy system and the robot may provide a separate import/export mechanism for caddies. Because of this, slots themselves have an additional logical state that they either 'exist' or they do not (i.e., the shelf that contains them has been removed).

Drives—Robots may contain some number of drives which may be divided into two types, 'writer' drives, i.e., those capable of burning new media, and 'reader' drives which are capable only of reading the burned media. Some drives may be both read and write capable.

Import/Export Slot—Most robots support some kind of mechanism for inserting and removing media to/from the robot, usually referred to as a 'mailbox'. Logically, the MSS system assumes the existence of an import/export slot in order to perform actions requiring the insertion or removal of media.

Transport—When media is moved from one location to another within the robot, some kind of transport device or 'picker' is used. Thus logically, media may be in the transport during the time it is being moved and thus the transport is unavailable for other moves until the media concerned leaves the transport.

Controller—In order to issue commands to the robot, the software 'talks' to a controller device that supports a command set allowing media movement of various types. Communication with the controller may be either by serial, SCSI, Internet, or any other logical communication means.

In the preferred embodiment, in order to logically refer to the various possible locations that media may be moved to/from, the logical MSS layer assigns the following numeric values to various locations which must be translated by the driver into the corresponding locations in the physical robot:

0-16383—Media Slot locations
16384-16384+256—Drive locations
32767—The transport
32766—The import/export slot In this abstraction, to add a new robot type, the following plug-ins may be used:

| FN. TYPEDEF | cmdName | REQD | DESCRIPTION |
| --- | --- | --- | --- |
| ET_MSSChunkMover | "Move" | Y | Move chunk from one location to another |
| ET_MSSSlotIniter | "CheckSlotStatus" | Y | Phys chck if range of slots empty/full |
| ET_MSSRobotIniter | "InitRobot" | Y | Initialize each autoloader (robotNum) |
| ET_MSSReadyForImporter | "MailBoxLockUlock" | N | Prep for import/export of a chunk |
| ET_MSSSlotStatusFn | "IsEmptyElement" | Y | Is a drive or slot is empty or full? |
| ET_MSSSlotStatusFn | "DoesElementExist" | N | Determine if a drive or slot exists |
| ET_MSSRobotIniter | "TermRobot" | N | Terminate each autoloader (robotNum) |
| ET_MSSShelfIO | "ImportExportShelf" | N | Eject/Restore entire contents of shelf |

Move—The move command is can be issued by the logical MSS layer in order to move media from one location to another. It is passed a logical source and destination address. The particular robotic driver translates the logical addresses to the corresponding physical addresses and then executes the move. In many cases, a single logical move command may translate to a series of physical moves in a particular robot. For example, a move from a slot to the import/export tray may equate to the sequence "move transport to slot, pick media, move transport to import export slot, place media".

CheckSlotStatus—Many robots have the ability to sense if a given slot or range of slots is empty or full. Some do this by moving the picker to each slot and attempting a pick. If the pick fails, the slot(s) is empty, otherwise it is full. Other robots maintain an internal map of slot status and this is used to respond to this command. In either case, this command can be issued by the logical MSS layer to obtain this status information.

InitRobot—This command is issued in order to initialize the state of the robot when the system first starts up. Many robots perform some form of initialization or calibration of picker position before they are ready to operate and if this is required, it should be invoked in the InitRobot call. Also, this call is the time when the driver first establishes communication with the controller and confirms that the robot is of the type expected and that it is operating correctly.

MailBoxLockUlock—This command can be issued to lock/un-lock the mailbox slot. In the preferred embodiment, the logic of the MSS layer is that the mailbox slot is preferably locked and that in order to insert/remove media from it, it must be temporarily un-locked and then re-locked when the transfer is complete. This logic is preferred because frequently in actual robotic implementations, the action of un-locking the mailbox may cause a physical obstruction to the picker mechanism and any attempt to move the picker while in this state may result in physical collision with the mailbox hardware. This same logic frequently exists for drives that are 'ejected' in that ejecting a drive usually means that the drive tray is sticking out (ready for media to be put on it) and this also will result in a physical collision if the picker is moved while the drive is in this state. For this reason, the logical MSS layer preferably maintains knowledge of the state of all drives and ensures that they are retracted before attempting a move in the robot.

IsEmptyElement—This command is similar to "CheckSlotStatus" above but requests that the robot physically verify the empty/full status of the slot. This is preferred in cases where the integrity of the logical MSS layer's map of slot contents, or that of the robot itself, may be suspect. This can occur when an operator physically opens the door of the robot and manually inserts or removes media. In this case, unless the media includes a tag or other form of ID, neither the robot nor the software has any way to be sure of what media is where in the robot. In this case, the software initiates a complete inventory for the slots and drives that is known as a "Cortical Wipe".

DoesElementExist—For robots that permit removal of entire shelves, it is usually the case that the robot has sensors that tell it which shelves are installed and which are not. This command is used to determine the existence of a slot based on this mechanism.

TermRobot—This command may be issued when the archiving software is shutting down and allows the driver to take whatever actions are necessary to bring the robotics to a stable state prior to shutdown. In the preferred embodiment, any communications path that was established to the robot controller would be tom down in the terminate call.

ImportExportShelf—In robots supporting the insertion/removal of entire shelves of media, this plug-in can be used to perform whatever specialized action is required to do this. If the robot is caddy based and provides an import/export device for caddies, this function would access and control this functionality.

To bring the discussion above more into focus, we will use some of the commercially available autoloaders to examine what is necessary to implement an actual robotic driver within this architecture. Many different autoloaders may be implemented in this architecture. The examples chosen are intended to illustrate the diversity of autoloader architectures, and the issues involved in implementing drivers for them:

The Pioneer P5004. This is a 500 CD autoloader containing up to four drives that may be any mixture of readers and reader/writers. Media is grouped into five (removable) shelves of 100 CDs each arranged vertically. There is no import/export slot so this function must be accomplished by loading media to/from the picker mechanism itself which can be locked/unlocked to grip/release the media. Control of the P5004 is via SCSI.

The Cygnet InfiniDISC autoloader. This autoloader consists of a number of rotating carousels, each of which contains up to 250 CD/DVD disks. The InfiniDisc is comprised of a number of different 19" rack mountable modules that can be installed in various configurations in order to make up a complete system. In the InfiniDisc coordinate system, X refers to the slot number (1 . . . 250) and Y refers to the DSU number (0 . . . 11). Up to 25 racks of equipment may be serially daisy chained and controlled via a single serial port. All InfiniDISC commands must be prefixed by the rack number (A to Y) to which they are being addressed. The drives in the InfiniDisc are numbered such that the bottom most drive is tray 0 and tray numbers increase upwards. The possible modules are:

1) CU (Control Unit) This is a 2U module containing the robotics controller. This unit is connected via various connectors on the back of the module to all the other components in the rack in order to allow them to be controlled. Control is via a serial (RS-422) link.

2) DU (Drive Unit) The drive unit is a 2U module containing two tray-loading CD/DVD drives. The DU is entirely controlled via SCSI.

3) DSU (Disk Storage Unit) The DSU is a 4U module that contains a rotating carousel holding up to 250 disks, each rack system can have up to 12 DSUs for a total of 3,000 disks per rack. The carousel is divided into 5 equal sections (to even out weight distribution) thus every time the slot number is incremented, it will spin one fifth the circumference of the carousel.

4) ATU (Arm Tower Unit) The ATU is a vertical disk carrier attached to the left side of the rack. Once a disk is picked from a DSU's extractor, it is vertically carried to any drive tray or vice-versa. No import/export slot is provided so this function is implemented by inserting/removing media from the ATU.

5) The rack. All modules are mounted in a standard 19" rack.

The TiltRac DVD-RAM DAU (Digital Archive Unit). This is nominally a 480 CD/DVD autoloader which may contain up to six drives and also provides a mail slot. Control of this autoloader is via a serial link. The autoloader also supports a bar-code reader which may be used to verify media disk identity.

P-5004

The P-5004 driver is a SCSI driver and thus makes use of the standard SCSI command set defined for autoloader devices, which makes implementation of the driver relatively simple. The driver registers the following plug-ins:

Move—The DRM-5004 move function is recursive since logical moves often translate into a series of physical moves. The logic is as follows:

```
static EngErr P54_Move       (              // P5004 Move command
                unsLong      robotNum,      // I: robot ID number
                unsLong      src,           // I: source slot of desired CD
                unsLong      dest,          // I: destination slot for CD
                int32        options        // I: various logical options
                             )              // R: zero for success, else error code
{
    if   ( !ML_IsRobotEnabled(robotNum) )
         return kRobotNotAvailable
    if   ( src and dest are slots )
    {                                       // slot to slot move!
         err = P54_Move (robotNum,src,kMediaTransportElement,options);
         if ( !err )                        // made it to the transport
         {
              err = P54_Move (robotNum,kMediaTransportElement,dest,options);
              if ( err )                    // failure, put it back in source
                  err = P54_Move (robotNum,kMediaTransportElement,src,options);
         }
         return err;
    }
    if ( src is a drive )
    {
         err = ML_OpenCloseTray(driveDevice,YES, . . . );
    }
    if   ( src == kMediaTransportElement )
         src = kMediaTransport;             // translate these from canonical form
    if ( src == kMediaImportExportElement ) // to SCSI defined value
         src = kMediaTransport;             // !!! use the transport as I/O slot
    if   ( dest == kMediaTransportElement )
         dest = kMediaTransport;
    if   ( dest == kMediaImportExportElement )
         dest = kMediaTransport;
    resultcode = issue the command to the robot
    if ( dest is a drive )
    {                                       // mount/retract the device
         err = ML_OpenCloseTray(driveDevice,No, . . . );
    }
}
```

CheckSlotStatus—This function simply issues a SCSI slot check command for each slot in the range, allowing the user to abort the process (via a progress bar) at any time since it may be lengthy.

InitRobot—This function issues a SCSI "test unit ready" command and then a SCSI "inquiry" command to retrieve the unit identification and firmware version.

TermRobot—No action required.

MailBoxLockUlock—This function moves the transport to a mid position in the autoloader and allows media to be inserted/removed.

IsEmptyElement—Issues a SCSI "element status" command,

ImportExportShelf—This function first disables the robot to ensure no other movement occurs during shelf removal, then prompts the user to perform the removal, then re-enables the robot.

InfiniDISC

The InfiniDISC is unusual in that the controller itself is directly capable of ejecting and retracting drive trays in addition to the ability to control drive tray position via SCSI commands issued by the drone that is physically attached to the drive (the normal mechanism). The state of the drive trays is critical in this architecture since the picker arm may easily collide with an incorrectly ejected drive tray. Communication with the controller is via serial commands. The logic used to translate logical slot numbers to physical X,Y addresses (IND_SlotToXY) is simply:

```
aYvalue = (slot-1)/250;           // DSU numbering starts from 0
anXvalue = 1 + ((slot-1) % 250);  // each DSU holds 250 CDs in this robot, slots start from 1
```

Move—The InfiniDISC move function is recursive since logical moves often translate into a series of physical moves.

CheckSlotStatus—This function takes advantage of the fact that each DSU in the InfiniDISC maintains a directory of the contents and thus this capability can be implemented simply by retrieving this directory and marking the slots empty/full as indicated by the directory. This is much faster than the more obvious approach of performing a series of attempted picks from the carousel.

InitRobot—This function issues a "system boot" command followed by an "Init System" command and then an "Inquiry" command to obtain the robot identification and firmware version.

TermRobot—No action required.

MailBoxLockUlock—No action required.

IsEmptyElement—Utilizes "CheckSlotStatus" above.

TiltRac DAU

In this autoloader, communication with the controller is via serial commands. The logic used to translate logical slot numbers to physical X,Y addresses (TL2_SlotToXY) is simply:

```
anXvalue = 1 + ((slot-1)/60);    // each shelf holds 60 CDs in this robot
aYvalue = 1 + ((slot-1) % 60);   // numbering starts from 1 not 0
```

Move—The logic for this function is virtually identical to that given for the InfiniDISC above.

CheckSlotStatus—This function operates by attempting a pick from the slot, however, because the timeout on a failed pick could be considerable because the robot makes repeated attempts, this function first puts the robot into diagnostic mode so that only one attempt is made.

InitRobot—This function is similar to that for other drivers but because the DAU is capable of sensing installed drives and returning their number and location, this function makes a number of consistency checks to ensure that the installation of the actual robot matches that specified via the archive preferences.

TermRobot—There are two serial connections to be torn down here, one to the controller and the other to the bar-code reader (if present).

MailBoxLockUlock—Issues a mail-box lock/unlock command.

IsEmptyElement—Utilizes "CheckSlotStatus" above.

Exhibit C provides a listing of the basic API necessary to gain access to the functionality provided by the logical MSS layer.

The function ML_SetPlayerState( ) updates a player state.

The function ML_ResolveFunc( ) resolves a plug-in registry name into the corresponding function pointer or NULL for an error.

The functions ML_MarkSlotBlank( ), ML_MarkSlotNotBlank( ), and ML_IsSlotBlank( ) mark a slot as containing/not containing a blank media chunk. The function ML_IsSlotBlank( ) determines a slots status as far as blank media is concerned The functions ML_MarkSlotPresent( ), ML_MarkSlotAbsent( ), ML_IsSlotAbsent( ) mark a slot as being present/absent in/from the robot. Certain robot types allow slots or entire shelves (caddies?) to be removed at which time all slots within the shelf become unavailable. ML_IsSlotPresent( ) returns the state present/absent status of the slot.

The function ML_IsSlotPresent( ) marks a slot as being present/absent in/from the robot. Certain robot types allow slots or entire shelves (caddies?) to be removed at which time all slots within the shelf become unavailable. ML_IsSlotPresent( ) returns the state present/absent status of the slot.

The function ML_MarkSlotNotEmpty( ) marks a slot as occupied/empty. The function ML_IsSlotEmpty( ) determines if a slot is empty or not.

The function ML_MarkSlotEmpty( ) marks a slot as occupied/empty. The function ML_IsSlotEmpty( ) determines if a slot is empty or not.

The function ML_IsSlotEmpty( ) marks a slot as occupied/empty. The function ML_IsSlotEmpty( ) determines if a slot is empty or not.

The function ML_CanControlDrive( ) determines if a drive matching the options and drone specified exists and is controllable. If it does, the corresponding robot and drive number are returned.

The function ML_VolNametoBatchID( ) given a batch ID, set up the corresponding volume name and vice-versa. This function is only valid within a server/drone.

The function ML_CallMoveFunc( ) is a local function used to invoke registered move functions and update other stuff as necessary.

The function ML_GetArchiveContext( ) is a wrapper for CL_GetArchiveContext( ).

The function ML_RegisterGlobalFunc( ) registers a global (i.e., non-autoloader specific) logical function by name. Defined logical functions are as follows:

| FN. TYPEDEF | cmdName | REQD | DESCRIPTION |
|---|---|---|---|
| ET_MSSMediaTyper type | "PrintMediaType" | N | produces C strng w readble media |
| ET_MSSInitTermRobotTypes | "InitRobotTypes" | Y | called once to init avail robot types |
| ET_MSSInitTermRobotTypes | "TermRobotTypes" | Y | called once to term avail robot types |
| ET_MSSArchiveGetter | "GetAnArchive" | Y | get/reserve an archive partition |
| ET_MSSArchiveRelease | "DropAnArchive" | Y | Release attached burn stn for archive |
| ET_MSSArchiveKickOff | "KickOffArchive" | Y | Initiate the archiving process |

An examples of the function types above is provided below:

```
Boolean myReleaseArchive    (                           // Release the attached
burn station
        OSType          droneServerType,    // I:type for drone srvr
to be used
```

-continued

|  | charPtr | volumeName, | // I:Name of the volume |
|---|---|---|---|
| to grab | | | |
| | unsLong | batchID | // I:Batch ID assoc w |
| vol to release | | | |
| | | ) | // R:TRUE for success, |
| FALSE otherwise | | | |
| Boolean myGetAnArchive | | ( | // get/reserve an |
| archive partition | | | |
| | unsLong | batchID, | // I:the batch ID |
| | OSType | *droneType, | // O:Contains drone type |
| for partitn | | | |
| | charPtr | volName | // O:ptr to returned |
| partition name | | | |
| | | ) | // R:TRUE for success, |
| FALSE otherwise | | | |

A standard implementation of archive burning for common devices (such as CD-ROMs and DVDs) is registered internally so most of the plug-ins above will often not be required.

In the preferred embodiment, the function ML_RegisterFunc( ) registers a logical function by name for a given autoloader type. Defined logical functions are listed above.

In the preferred embodiment, the function ML_OpenCloseTray( ) uses the function UF_OpenCloseTray to Open/Close the media tray for a removable drive without having to have the drive mounted or contain any media. In addition, this routine updates the robot->Players[ ].scsiXX fields of the archive context record to match the device information found as a result of finding a mounted volume in the device specified. This latter behavior should be unnecessary but may be useful in the event that the information matching SCSI devices to players is entered wrongly. In such a case, this function would correct such a problem.

In the preferred embodiment, the function ML_CurrentItemLocation( ) returns the server data type of the drone or master server in which the media 'chunk' associated with a given item in the server DB is currently loaded. If the item is not currently loaded or is on the local machine, this routine returns 0. This routine can only be called from within an archive plug-in of a ClientServer server.

In the preferred embodiment, the function ML_SetDroneCallbacks( ) causes certain archiving callbacks to be altered for callbacks that instead send a request to the specified 'parent' server in order to control the autoloader. This is necessary in cases where a server is distributed over more than one machine and is controlled centrally by the parent server.

In the preferred embodiment, the function ML_GetCurrentBatchDetails( ) can be used to obtain details of the batch currently being processed by a given drone/master server. The only anticipated need for such information might be for use in implementing custom file put routers (see ClientServer).

If use of the default file get/put routers provided by the MSS layer in a distributed server is desired, the function ML_UseDefaultFileRouters( ) could be called during the definition of the server and drone callbacks. The default routers are data type independent and for data types with specialized needs ot may be desirable to provide alternative routers. A sample embodiment of a 'put' router algorithm is provided below:

1) Only route to drones that are currently running.

2) If any batch is already less than 90% without adding the current file and adding the incoming file (described by rrP) will make any batch be >90% complete (but not >100%) then pick the least busy drone out of all drones meeting this criteria. If there is more than one least busy drone, pick at random from them.

3) If and only if (2) is not met, then if there are any drones available for which the current batch will not go over 100% by adding the incoming file, pick the least busy drone from all drones meeting this criteria, if more than one such drone, pick at random from them.

4) Otherwise pick the least busy from all available drones, if more than one available drone, pick at random from them.

The goals of this algorithm are:

a) To ensure that batches are created that exceed the 90% media utilization criteria and are as close to 100% as possible.

b) Once a batch reaches the 90% level, it will be burned in preference to adding to a less complete batch in order to ensure that batches do not all build up and then get flushed at around the same time thus overloading burner resources.

c) If it is possible to avoid burning a batch with less than 90% utilization, the system will do so by adding to an incomplete batch.

d) Wherever a choice exists after applying the rules above, pick the least busy drone (based on # of clients).

e) If a choice still exists pick at random.

The ClientServer file 'get' router plug-in used to route file fetches from the server OUTPUT folder to the appropriate drone server. This function can be called in either the master or the drone servers whenever the marker value (see DB_GetMarkerValue) for an item is equal to ~0. In the master server call (which can be identified via the data type implied by the 'ip' parameter) the router function should select from the available active drone types to handle the request and return that type as the result, thus causing the request to be forwarded to the drone selected. In this case, any changes made to 'aFullFilePath' will have no effect. In the drone call (again identified by use of the 'ip' parameter), the router would preferably alter the 'aFullFilePath' value if necessary and then return zero as the result (implying no further forwarding is required). Alternatively further routing may be achieved by returning some other legal drone type. The default file 'get' router implements the following strategy:

1) If the media chunk for a given item is already mounted in one of the available drones or if the item is within the server output folder of such a drone, route to that drone.

2) Otherwise pick the least busy available drone (determined by current number of clients).

3) If more than one 'least busy' drone, pick at random from them.

In the preferred embodiment, the function ML_UnloadAllMedia( ) would return archived media chunks that are currently loaded in a drive back to their home slots and their status is updated to reflect the move. The function is preferably implemented as a custom command and is normally called from the test program. The function is a useful testing aid.

In the preferred embodiment, the function ML_EnbDisRobot( ) allows Enable/Disable of movement in a specified robot.

In the preferred embodiment, the function ML_EnbDisAllRobots( ) allows Enable/Disable of movement of all robots.

In the preferred embodiment, the function ML_IsRobotEnabled( ) determines if a given robot it enabled or not.

The foregoing description of the preferred embodiments of the invention has been presented for the purposes of illustration and description. For example, although described with respect to the C programming language, any programming language could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A large scale distributed multimedia system comprising:
   a) one or more servers, wherein each of said one or more servers includes i) a main server thread; ii) one or more threads capable of monitoring incoming data feeds and instantiating the resultant data into the system (monitoring threads), and iii) one or more threads capable of handling incoming data requests (request threads); and iv) cache memory;
   b) logically connected to said one or more servers, a mass storage system, wherein said mass storage system stores information concerning an arrangement of said one or more servers and is capable of controlling one or more robotic autoloader systems (robots);
   c) logically connected to said one or more servers, a types system for defining data types at a binary level and for associating said data types with said one or more servers such that a mapping maps data types with said one or more servers that must be addressed to obtain the corresponding data; and
   d) logically connected to said one or more servers, a query system for executing data queries on said one or more servers mapped to said data type being queried.

2. The system of claim 1, further comprising an output folder logically connected to said one or more servers, wherein said output folder stores a multimedia portion of any said data feeds acquired by said one or more servers.

3. The system of claim 2, wherein said output folder stores batches of information to be migrated to said mass storage system.

4. The system of claim 1, wherein each of said one or more servers includes a same core software.

5. The system of claim 1, wherein each of said one or more servers is configured at run-time to support a different functionality.

6. The system of claim 1, wherein each of said one or more servers is customized using at least one registered plug-in.

7. The system of claim 1, wherein at least one server has a main server and a drone server that transparently operate as part of a single logical server cluster.

8. The system of claim 7, wherein said drone server is tasked by said main server.

9. The system of claim 1, wherein at least one server has a first and second drone servers, wherein said first drone server is tasked by said second drone server.

10. The system of claim 7, wherein said logical server cluster is physically distributed over a wide area.

11. The system of claim 7, wherein each said server in said logical server cluster communicates with other servers (including other servers in said logical server cluster) using a standard communication protocol.

12. The system of claim 1, wherein said mass storage system stores information concerning a logical arrangement of said one or more servers.

13. The system of claim 1, wherein said mass storage system stores information concerning a physical location of said one or more servers.

14. The system of claim 1, wherein said mass storage system is capable of fulfilling one or more information requests from a server by directing a robot to mount a drive that stores a corresponding information.

15. The system of claim 1, wherein said mass storage system includes logical operations that enable migration of data from cache based storage to storage managed by said one or more robots.

16. The system of claim 15, wherein said mass storage system includes definitions for drivers of one or more devices, such definitions mapping said logical operations provided by said mass storage system to one or more commands necessary to implement said logical operations for a given device of said one or more devices.

17. The system of claim 2 further comprising:
   one or more client machines that are logically connected to said one or more servers and that use said logical connection to submit one or more queries to said query system.

18. The system of claim 17, wherein said query system is capable of distributing portions of a query received from said one or more client machines (each a distributed query) to said one or more servers based on a functionality supported by said one or more servers.

19. The system of claim 18, wherein said query system reassembles a results of said distributed queries into a unified list.

20. The system of claim 19, wherein said query system is capable of saving and executing said one or more queries on a continuous basis against any new data acquired from said data feeds being monitored by said monitoring threads.

21. The system of claim 20, wherein said one or more queries saved and executed by said query system includes one or more interest profiles corresponding to one or more client machines such that whenever a new data arrives from said data feeds that matches said one or more interest profiles, a corresponding client is notified by query system.

22. The system of claim 17, wherein each of said one or more client machines includes a server functionality such that each of said one or more client machines is capable of making data available to the system.

23. The system of claim 22, wherein said server functionality stored on each of said one or more client machines permits any other client machine in the system to discover any said data types served by each of said one or more client machines (if any).

24. The system of claim 1, wherein at least one server of said one or more servers enables direct access to one or more databases.

25. The system of claim 1, further comprising an input folder, wherein data coming from said incoming data feeds that are monitored by said monitoring threads are stored in said input folder in a hierarchical manner.

26. The system of claim 25, wherein said one or more servers includes one or more monitoring threads that monitors said input folder for changes.

27. The system of claim 26, wherein said one or more monitoring threads further supports defined aliases (or references) to data on other client machines such that, responsive to a request from a client machine, said one or more monitoring threads will acquire said data and transfer it to said input folder for processing.

28. The system of claim 25, further comprising a rejects folder, wherein said rejects folder stores any said incoming data feeds that cannot be processed by said input folder.

29. The system of claim 1, wherein said one or more servers further includes a maintenance interface, said maintenance interface permitting registration and execution of arbitrary maintenance functions.

30. The system of claim 17, wherein said one or more servers further includes custom commands and APIs that are registered on said one or more servers.

31. The system of claim 30, wherein said custom commands and said APIs registered on said one or more servers are based, at least in part, on a functionality associated with said one or more servers.

32. The system of claim 31, wherein said query system further includes one or more registered custom commands and APIs for a given said data type.

33. The system of claim 17, wherein said query system is capable of searching and retrieving data stored on said one or more robots using customizable aliases stored in said output folder.

34. The system of claim 1, wherein said one or more servers further include one or more routing algorithms to route commands and responses to/from one or more client machines that make up a logical server cluster.

* * * * *

UNITED STATES PATENT AND TRADEMARK OFFICE
CERTIFICATE OF CORRECTION

| | | |
|---|---|---|
| PATENT NO. | : 7,143,087 B2 | Page 1 of 1 |
| APPLICATION NO. | : 10/357259 | |
| DATED | : November 28, 2006 | |
| INVENTOR(S) | : John Fairweather | |

It is certified that error appears in the above-identified patent and that said Letters Patent is hereby corrected as shown below:

Column 54,
line 65, Add the word -- said -- between the words "by" and "query".

Signed and Sealed this

Ninth Day of January, 2007

JON W. DUDAS
*Director of the United States Patent and Trademark Office*